(12) United States Patent
Magner

(10) Patent No.: US 12,168,397 B2
(45) Date of Patent: Dec. 17, 2024

(54) CHARGING FREQUENCY DETERMINATION FOR WIRELESS POWER TRANSFER

(71) Applicant: InductEV, Inc., King of Prussia, PA (US)

(72) Inventor: Christopher A. Magner, Lancaster, PA (US)

(73) Assignee: InductEV, Inc., King of Prussia, PA (US)

( * ) Notice: Subject to any disclaimer, the term of this patent is extended or adjusted under 35 U.S.C. 154(b) by 531 days.

(21) Appl. No.: 17/643,764

(22) Filed: Dec. 10, 2021

(65) Prior Publication Data

US 2023/0182588 A1 Jun. 15, 2023

(51) Int. Cl.
*H02J 7/00* (2006.01)
*B60L 53/12* (2019.01)
*H02J 50/12* (2016.01)
*H02J 50/80* (2016.01)
*H04B 5/26* (2024.01)
*H04B 5/79* (2024.01)

(52) U.S. Cl.
CPC .......... *B60L 53/12* (2019.02); *H02J 7/00034* (2020.01); *H02J 50/12* (2016.02); *H02J 50/80* (2016.02); *H04B 5/26* (2024.01); *H04B 5/79* (2024.01)

(58) Field of Classification Search
CPC . B60L 53/12; H02J 50/12; H02J 50/80; H02J 7/00034; H04B 5/26; H04B 5/79
USPC ........................................... 320/108; 307/104
See application file for complete search history.

(56) References Cited

U.S. PATENT DOCUMENTS

| | | | |
|---|---|---|---|
| 10,403,113 B1 | 9/2019 | Antar et al. | |
| 11,038,414 B1* | 6/2021 | Zhang | H02M 3/07 |
| 2012/0153894 A1 | 6/2012 | Widmer | |
| 2015/0042168 A1 | 2/2015 | Widmer | |
| 2016/0141919 A1* | 5/2016 | Ohashi | H02J 50/90 |
| | | | 320/108 |

(Continued)

OTHER PUBLICATIONS

Karalis, Aristeidis et al., "Efficient wireless non-radiative mid-range energy transfer," Annals of Physics, vol. 323, Issue 1, Jan. 2008, 19 pages.

(Continued)

*Primary Examiner* — Zixuan Zhou
(74) *Attorney, Agent, or Firm* — Michael P. Dunnam; Culhane Meadows PLLC

(57) ABSTRACT

A charging frequency between a transmitting coil and a receiving coil of a wireless power transfer (WPT) system is found by setting an input voltage to the transmitting coil at a fixed voltage, shunting the receiving coil, determining a first input current frequency range in which a resonant frequency is expected to be found, frequency polling within the first input current frequency range using a set of polling frequencies in the first input current frequency range, and selecting as the charging frequency a polling frequency having a lowest input current. The first input current frequency range may be found by setting the first input current frequency range based on regulation, international electromagnetic frequency allotments, or prior experience with WPT between the transmitting coil and the receiving coil. A frequency range around the input current minima is selected to poll for a charging frequency that approximates the resonant frequency.

32 Claims, 12 Drawing Sheets

(56) References Cited

U.S. PATENT DOCUMENTS

2016/0368386 A1*  12/2016  Noguchi .............. H02J 50/20
2017/0368944 A1   12/2017  Huang et al.
2019/0006891 A1    1/2019  Park et al.
2019/0393731 A1*  12/2019  Maniktala ........... H02J 50/20
2020/0106307 A1    4/2020  Russell et al.

OTHER PUBLICATIONS

Kong, Fanpeng et al., "A Coil Misalignment Compensation Concept for Wireless Power Transfer Links in Biomedical Implants," 2015 IEEE Wireless Power Transfer Conference, May 13-15, 2015, Boulder, Colorado, 4 pages.

Kurs, André et al., "Wireless Power Transfer via Strongly Coupled Magnetic Resonances," Science, vol. 317, Issue 5834, Jul. 6, 2007, pp. 83-86.

Li, Siqi et al., "Wireless Power Transfer for Electric Vehicle Applications," IEEE Journal of Emerging and Selected Topics in Power Electronics, vol. 3, Issue 1, Mar. 2015, pp. 4-17.

Long, Bruce et al., "Which Way for Wireless Power: High Q or High k?" 2016 IEEE PELS Workshop on Emerging Technologies: Wireless Power Transfer (WoW), Oct. 4-6, 2016, Knoxville, Tennessee, 5 pages.

International Search Report and Written Opinion for International Application No. PCT/US2022/050157 dated Feb. 2, 2023.

* cited by examiner

CHARGING FREQUENCY DETERMINATION FOR WIRELESS POWER TRANSFER

TECHNICAL FIELD

The present disclosure relates generally to wireless power transfer, and more specifically, to devices, systems, and methods related to wireless power transfer to remote systems such as vehicles including batteries. More particularly, the present disclosure relates to identifying a charging frequency for wireless power transfer that minimizes charging time and provides for improved charging efficiency.

BACKGROUND

Use of magnetic induction (wireless) power transfer systems for supplying power over an air gap has been known since 1900 AD. A primary (transmission) inductive coil is paired with a secondary (receiver) inductive coil with power transmitted across a dielectric, which is commonly an air gap. Also well-known is the use of Alternating Current (AC) applied to the primary coil to generate the necessary oscillating magnetic field. Maximum power transfer efficiency is achieved by a magnetically coupled inductive wireless power system when the AC input is at the resonant frequency.

Recent trends to eliminate the use of the internal combustion engine along with advances in energy storage have made Battery Operated Electric Vehicles (BOEVs) more marketable. Wireless Power Transfer (WPT) systems can be used to recharge BOEVs. The inherent safety of WPT with no exposed conductors and reliability from lack of connectors and moving parts is useful as high-power charging, to shorten the overall charging duration, becomes the norm.

SUMMARY

Various examples are now described to introduce a selection of concepts in a simplified form that are further described below in the Detailed Description. The Summary is not intended to be used to limit the scope of the claimed subject matter.

A wireless power transfer (WPT) charger is provided that includes a transmitting coil that wirelessly transmits electrical energy to a receiving coil at a charging frequency and a controller that includes a processor that executes instructions to determine the charging frequency between the transmitting coil and the receiving coil. The controller executes the instructions to implement a method that performs operations including setting an input voltage to the transmitting coil at a fixed voltage, shunting the receiving coil, determining a first input current frequency range in which a resonant frequency is expected to be found, frequency polling within the first input current frequency range using a set of polling frequencies in the first input current frequency range, and selecting as the charging frequency a polling frequency having a lowest input current. The first input current frequency range in which the resonant frequency is expected to be found may be determined by setting the first input current frequency range based on at least one of regulation, international electromagnetic frequency allotments, or prior experience with WPT between the transmitting coil and the receiving coil.

Polling frequencies within the first input current frequency range may include determining an input current minima at the set of polling frequencies, determining a second input current frequency range around the input current minima that is narrower than the first input current frequency range, and frequency polling within the second input current frequency range using a second set of polling frequencies in the second input current frequency range. The second input current frequency range around the input current minima may be determined by determining two polling frequencies in the set of polling frequencies with the lowest input currents, and using the two polling frequencies to define upper and lower boundaries of the second input current frequency range. Alternatively, the second input current frequency range around the input current minima may be determined by determining two polling frequencies adjacent a polling frequency having a lowest input current, and using the two polling frequencies to define upper and lower boundaries of the second input current frequency range. In performing the polling, a plurality of frequency maps may be determined where the frequency maps have a measurement distribution determined from a probability of the input current minima being within a frequency range of the respective frequency map. The polling frequencies are taken from the respective frequency maps.

In sample configurations, when the polling frequency having the lowest input current cannot be determined above an input current uncertainty limit, the processor of the controller may further execute instructions to perform operations including segmenting an input current versus input current frequency response curve into a lower response curve above the input current uncertainty limit and an upper response curve above the input current uncertainty limit, and selecting a highest frequency point on the lower response curve above the input current uncertainty limit as the charging frequency. Alternatively, the charging frequency may be selected as a mid-point frequency between a lower intersection frequency where the lower response curve intersects the input current uncertainty limit and an upper intersection frequency where the upper response curve intersects the input current uncertainty limit or as a frequency between the lower intersection frequency and the mid-point frequency between the lower intersection frequency and the upper intersection frequency where the selected frequency is a percentage of the distance between the lower intersection frequency and the mid-point frequency.

Alternatively, when the polling frequency having the lowest input current cannot be determined above the input current uncertainty limit, the processor of the controller may further execute instructions to use a first linear projection of the lower response curve based on at least two polling frequencies adjacent to the input current uncertainty limit for the lower response curve and a second linear projection of the upper response curve based on at least two polling frequencies adjacent to the input current uncertainty limit to find an intersection point between the first and second linear projections, and select a frequency of the intersection point as the charging frequency. In another alternative, the processor of the controller may further execute instructions to perform operations including fit curves to at least three polling frequencies adjacent to the input current uncertainty limit for the lower response curve and for the upper response curve to find an intersection point between curves fitted to the lower response curve and the upper response curve, and select a frequency of the intersection point as the charging frequency.

The steps of determining the first input current frequency range, frequency polling step, and charging frequency selection may be performed a plurality of times for different input voltages for each iteration. The different input voltages for each iteration may include different percentages of a requested power level. In such a configuration, the processor may execute additional instructions to perform operations including determining a relationship between power level and resonant frequency at each power level, and determining from the relationship a resonant frequency at the requested power level.

In other configurations, the processor of the controller may execute additional instructions to avoid transmitting coil overcurrent due to over-coupling between the transmitting coil and the receiving coil by performing operations including making a first current measurement at a lower frequency boundary of the frequency range, and when the first current measurement is above a safety current threshold for current sensing, aborting the charging frequency determination or resuming the charging frequency determination at a lower fixed input voltage level to the transmitting coil.

In still other configurations, the input voltage to the transmitting coil is set at a fixed voltage by shunting the receiving coil, setting the first input current frequency at a polling frequency in the first input current frequency range, varying the input voltage to the transmitting coil in increments, measuring input current to the transmitting coil at each voltage increment until a safety margin threshold but not an adversity threshold is exceeded by the input current measurement, and selecting the fixed voltage as a voltage at a last voltage increment where the input current measurement is below the safety margin threshold. Varying the input voltage to the transmitting coil in increments include using a first voltage increment until the transmitting coil's input current exceeds a guard threshold less than the safety margin threshold, and using a second voltage increment, smaller than the first voltage increment, until the transmitting coil's input current exceeds the safety margin threshold or a nominal test voltage is obtained.

This summary section is provided to introduce aspects of the inventive subject matter in a simplified form, with further explanation of the inventive subject matter following in the text of the detailed description. The particular combination and order of elements listed in this summary section is not intended to provide limitation to the elements of the claimed subject matter. Rather, it will be understood that this section provides summarized examples of some of the examples described in the Detailed Description below.

BRIEF DESCRIPTION OF THE DRAWINGS

The foregoing and other beneficial features and advantages of the invention will become apparent from the following detailed description in connection with the attached figures, of which.

DETAILED DESCRIPTION

Figure 1:
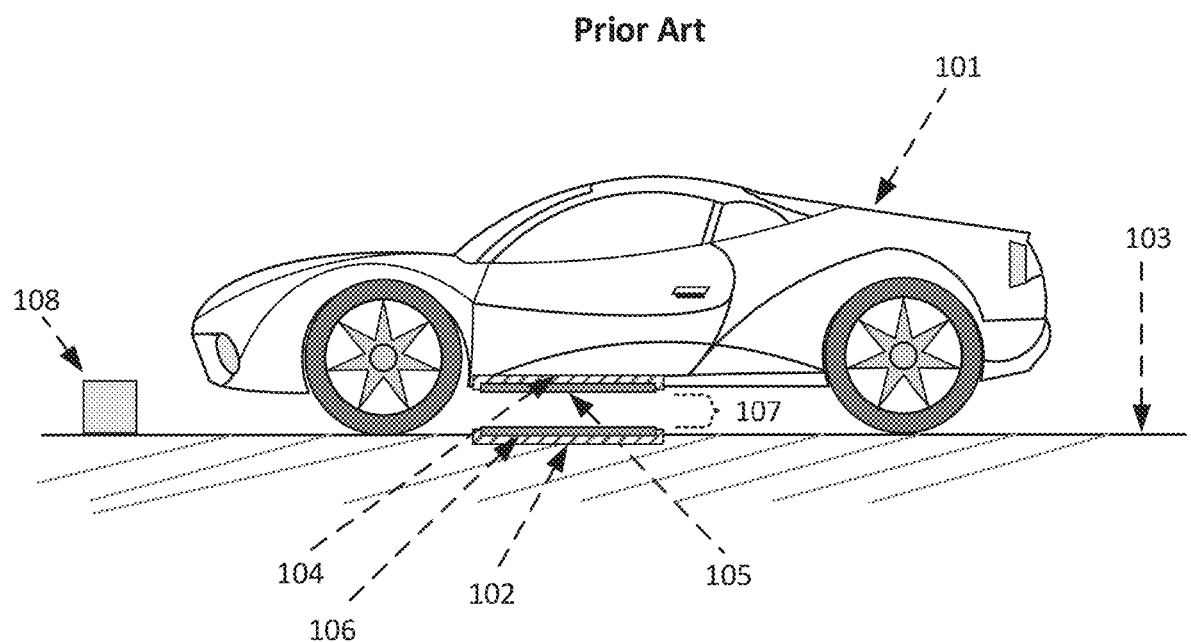
FIG. 1 illustrates the use and major components of a wireless power transfer system in a sample configuration.

A detailed description of illustrative examples will now be described with reference to FIGS. 1-12. Although this description provides a detailed description of possible implementations, it should be noted that these details are intended to be exemplary and in no way delimit the scope of the inventive subject matter.

Directions are provided herein in accordance with the common meaning. Using ISO 4130:1978, *"Road vehicles—Three-dimensional reference system and fiducial marks"* as a guide to the Cartesian coordinate system, forward is the −x direction, +x is the reverse or backwards direction, right is the +y direction and left is the −y direction. The horizontal z=0 plane corresponds to ground-level, grade, or pavement level with +z being the upwards direction and −z being the downwards direction (below grade).

As used herein, the term "battery" depicts a generic chemical energy storage system and could be replaced, supplemented, or hybridized with other portable energy storage systems (e.g., solid-state batteries, reversable fuel cells, ultra-capacitors, etc.). Also, while many of the examples used are of a wireless power transfer (WPT) system used to power the onboard systems and charge the batteries of a stationary electric vehicle (EV), this use is by no means the only use contemplated.

Since the wireless power transfer system is modular and can have bi-directional charging ability, the term Ground Transceiver Station (GTS) is used to refer to a grouping of Ground Transceiver Assemblies (GTAs), and Vehicle Transceiver Station (VTS) is used to refer to a grouping of Vehicle Transfer Assemblies (VTAs). A GTS may consist of one-or-more GTAs and a VTS may consist of one-of-more VTAs. For maximum power transfer capability, every VTA in a VTS is paired and aligned with a corresponding GTA in the GTS. Aligned refers to the primary coil to secondary coil being in magnetic not necessarily geometric alignment.

As described in U.S. patent application Ser. No. 16/940,658, entitled "Efficiency Gains Through Magnetic Field Management," automatic determination of resonant frequency is useful even if the vehicle make and model are conveyed, if the characteristics of the GTA are known and the VTA characteristics can be obtained, or if the vehicle has been charged by the WPT charger before and historical physical and magnetics information has been retained by the GTS or a charging station controller. The exact resonant frequency of the paired GTA and VTA may vary from unit to unit and EV to EV, since different manufacturers of VTAs (and GTAs) may construct the units differently. Also, factors that affect the coupling factor (k) and therefore the resonant frequency may include differing coil-to-coil gaps (e.g., Z gaps) that may differ between EVs even of the same make, model, and year. The Z-Gap may also be affected by the loaded versus unloaded state of the EV, by use of adaptive suspension and kneeling, and by after-market modifications that affect the height of the vehicle chassis. Each charging also may experience misalignment due to roll, pitch, and yaw of the VTS.

The use of a modular WPT, that is with multiple primary coils and paired secondary coils, requires that the resonant frequency for each GTA-VTA pair be predetermined for maximum efficiency of power transfer.

The term "Deterministic" is used where the resonance frequency was found via measurement of the GTA current response versus frequency. The term "Selected" is used where the resonance frequency cannot be found via measurement, but a more efficient frequency can be selected than allowed by the measurement data limitations. The term "Projected" is used where the resonance frequency cannot be found directly via measurement, but a more efficient frequency can be estimated from the measurement data.

FIG. 1

FIG. 1 illustrates a wireless power transfer system for EVs in the act of charging in a sample configuration. The EV 101 is at rest over the ground charger 102. The ground charger (Ground Transceiver Station (GTS)) 102 is here shown as projecting above the pavement 103 although other GTS 102 installations are contemplated (e.g., flush-mounted with the pavement, embedded under the pavement). The vehicle transceiver station (VTS) 104 is affixed to the underside of the EV 101 in this example.

The GTS 102 includes 1-or-more coil assemblies 106 with ancillary apparatus and structural members for mechanical support, cooling, eddy current shielding and inductive communications links (collectively a Ground Transceiver Assembly (GTA)). Similarly, the VTS 104 includes 1-or-more Vehicle Transceiver Assemblies (VTAs), each with a coil assembly 105 and ancillary apparatus and structural members for mechanical support, cooling, eddy current shielding and inductive communications links. The GTA coil 106 and the VTA vehicle coil 105 are the same size in the X-Y plane but can be made with differing numbers of turns. The coil-to-coil gap 107 in the Z plane is a function of ground charger 102 type, EV build, and EV loading. In addition to the coil-to-coil-gap, the GTA-to-VTA orientation may experience centering offsets as well as deviations from parallel coil matching from roll, pitch, and yaw. The positioning deviations may be unique for each charging session and are unknown prior to measurement. Each positioning deviation and coil-to-coil gap affects the value of the coupling constant (k) resulting in an individualized resonant frequency for each GTA-to-VTA pair for each charging session. The curb 108 is a visual (and occasionally haptic) indicator of the GTS position for the driver, driver assistance system, or autonomous driving system.

Although in FIG. 1 both the GTS 102 and VTS 104 are shown as single coil assemblies (the GTS has a single GTA and the VTS has a single VTA in FIG. 1), multiple coil assembly pairs (wireless couplers) can be used for higher power transfer. The advantages of a modular approach to wireless power systems also come into play. By manufacturing of a single GTA and a single standard VTA, economies of scale can be achieved as the GTAs are combined into larger Ground-Transceiver-Stations (GTSs) to serve the EV mounted VTS with its one-or-more VTAs.

The modular GTS and VTS allow for charging stations where the flexible, dynamically assignable, dynamically configurable GTS configurations (e.g., 1 GTA per GTS, 2 side-by-side (2×1) GTAs per GTS, 2 in-line (1×2) GTAs per GTS, 3 in-line (1×3) GTAs per GTS, 4 GTAs (2×2) per GTS, 6 GTAs (2×3) per GTS, or any GTA configuration that supports the largest vehicle VTS (with a corresponding set of VTAs to be served) may be constructed.

Also, the GTS 102 and VTS 104 can be part of a bi-directional WPT where the primary and secondary are switchable and the EV provides energy to the electrical grid (not shown). Since a GTS 102 and paired VTS 104 may be operated in bidirectional mode, the wireless energy transfer can be from the electrical grid (via the GTS) to the vehicle (via the VTS) or reversed with the power originating from the EV's energy storage (e.g., battery pack) transmitted by the VTS to the GTS for powering a DC or AC load (e.g., a house).

FIG. 2

Figure 2:
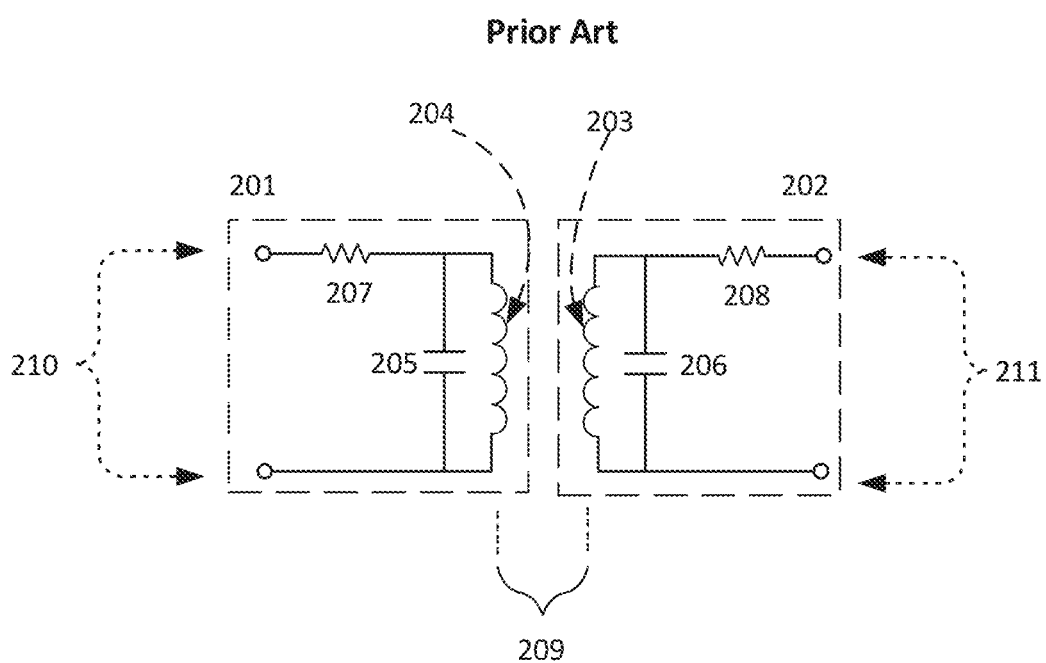
FIG. 2 schematically illustrates a parallel-parallel resonant induction circuit in a sample configuration.

FIG. 2 schematically illustrates an exemplary balanced Parallel-Parallel Resonant Network (PPRN circuit) for use in an inductively coupled wireless power transfer system using a Thevenin circuit representation. The primary coil assembly 201 and the secondary coil assembly 202 serve to transfer energy via mutual induction to the secondary coil 203 from the primary coil 204. The primary coil 204 and the primary capacitor 205 and the secondary coil 203 and secondary capacitor 206 are selected in value to create a mutually resonant circuit. The inter-coil gap 209 is present in all inductive WPT systems and can vary with each EV and each charging session. The secondary output 211 appears as an AC Voltage Controlled Current Source (VCCS) to the load (not shown), nominally an EV battery pack.

For a resonant induction power transfer circuit, the complex impedance Z as seen by the voltage source 210 is a function of angular frequency ($\omega=2\pi f$) of the coupled coil pair where $j^2=(-1)$ and with coupling coefficient k, with primary resistance R, primary coil inductance L, and primary capacitance C is as is shown in Equation 1.0:

$$Z(\omega)=R+1/(j\omega C)+j\omega(1-k)L+j\omega kL[(R+1/j\omega C+j\omega(1-k)L]/(R+(1/j\omega C)+j\omega L)]$$ Eqn 1.0.

Therefore, the magnitude of a GTA input current is shown in in terms of Voltage (V) and current (I) with impedance Z in Equation 1.1:

$$I[\text{magnitude}](\omega)=[V/|Z(\omega)|]$$ Eqn 1.1.

While the frequency can be selected and the resistance, inductance, and capacitance can all be known a priori to wireless charging, the value of the coupling coefficient (k) cannot. Therefore, the input current to the primary coil assembly cannot be deterministically calculated for a useful range of primary assembly input voltages or input frequencies

FIG. 3

Figure 3:
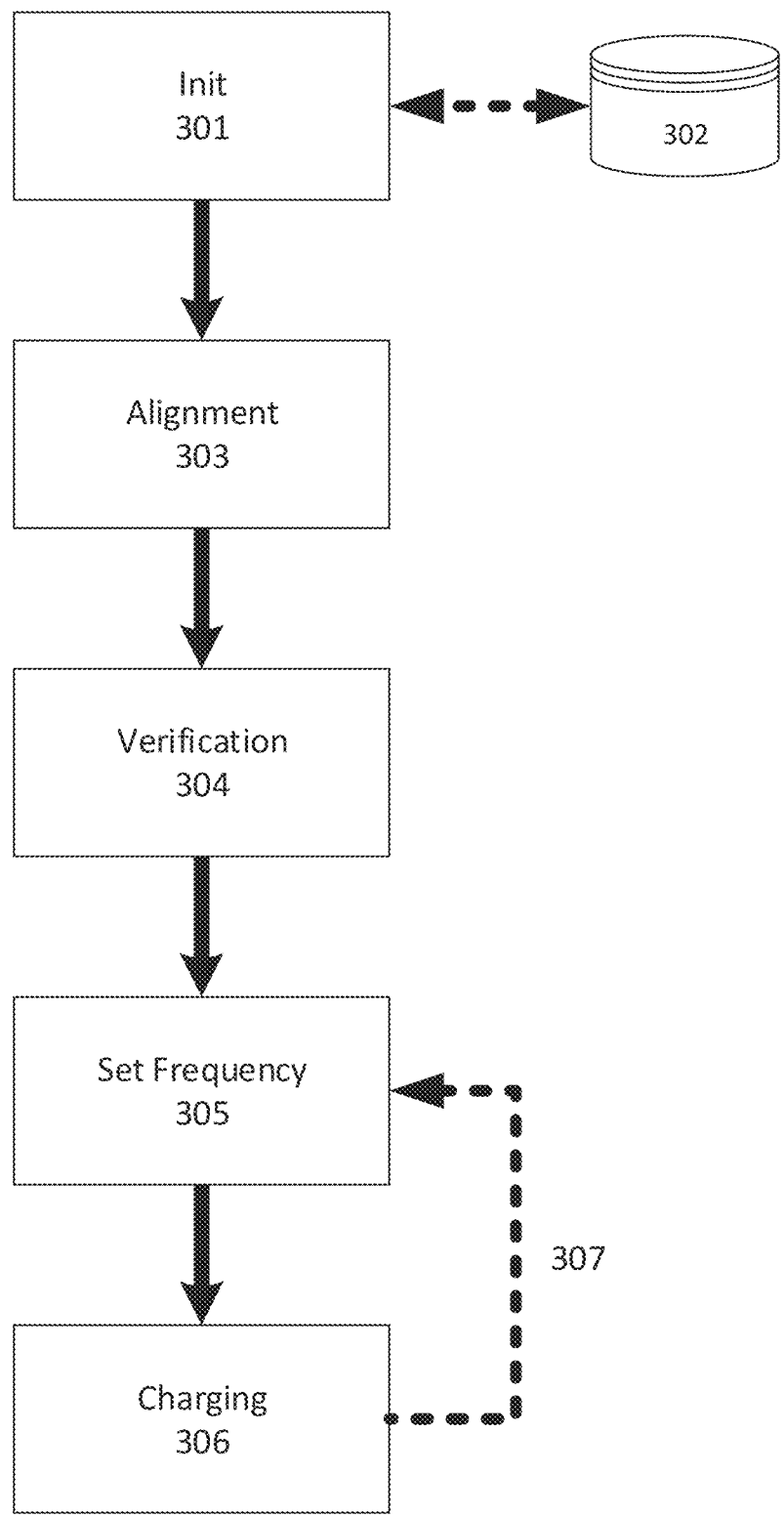
FIG. 3 diagrammatically illustrates the charging procedure in a sample configuration.

FIG. 3 illustrates chronologically the events leading up to and including a wireless charging session.

Initialization 301 occurs when the electric vehicle (EV) and ground transceiver station (GTS) establish 2-way communications. Once 2-way communications are functional, information may (optionally) be obtained from a datastore 302. This information may contain data on the EV (e.g., EV identifier, nominal height, at-rest or kneeling height, number of VTAs, individual VTA magnetics profile (e.g., coil characteristics of inductance, dimensions, total turns, resistance, impedance, calibrated center frequency at resonance). The datastore 302 may also have past resonant frequency estimates for prior charging sessions.

During Alignment 303, the EV driver (or driver assistance system or autonomous driver system) receives guidance information and course corrections so that the EV comes to rest with the EV's VTS well-aligned with the GTS resulting in each VTA paired with a GTA. The guidance assistance can be visual markers, visual light indicators or reflectors, pavement embedded radio antennas, radio beacons, pavement shaping (bumps or troughs), pavement markers, and the like.

In Verification 304, the status and alignment of the EV is checked. Using GTS-to-EV wireless communications as described, for example, in U.S. Pat. No. 10,135,496, entitled "Near field, full duplex data link for use in static and dynamic resonant induction wireless charging," U.S. Pat. No. 10,826,565, entitled "Near field, full duplex data link for resonant induction wireless charging," and U.S. Pat. No. 11,121,740, entitled "Near field, full duplex data link for resonant induction wireless charging," the state of the vehicle (lowered or kneeling, battery status (voltage, SoC), VTS status (for each VTA), battery management system (BMS) status, requested power level) is queried by the charger.

To Set the Frequency 305, the polling methodology for resonant frequency determination as described herein is used. For each GTA paired with a corresponding and aligned VTA, a fixed ground coil voltage is applied at a set of frequencies and the resultant GTA input current is measured. From the polling at the set of input frequencies and the magnitude of the GTA current, a resonant frequency is determined for each VTA/GTA pair. The set of polled frequencies can be an evenly spaced linear distribution across the available bandwidth or be concentrated probabilistically or historically so as to obtain the closest estimate of the resonant frequency. Examples of Frequency polling spacing can range from 10 Hz to 1000 Hz dependent on polling distribution pattern(s) or stage (in a multi-stage frequency determination). Minimization of the number of samples allows for less delay in charging due to frequency determination.

Where an exact resonant frequency cannot be determined, an estimated or calculated frequency based on transfer efficiency is used. Measurement of the GTA coil current can be achieved by using the current sense circuit described in U.S. patent application Ser. No. 16/825,624, entitled "Current Sensing in a Wireless Power Transfer System."

In Charging 306, each VTA is un-shunted and then each GTA receives AC current at the determined resonant frequency to enable efficient transfer power to the corresponding VTA at the requested (nominally 100%) level. The AC input signal may be a sinusoid, ramp, or square wave.

During Charging 306, the coupling factor may change, for instance as the GTA and VTA components heat up and/or the EV undergoes loading or unloading. It is possible to interrupt power transfer and reactivate 307 the frequency determination procedure in set frequency 305. This is purely an optional operation as reactivation of the frequency determination procedure will increase the duration of the charging session.

The frequency determination procedure can be executed concurrently on all active GTAs within the GTS.

While the total duration of pre-charge activities (<5 seconds) is small compared to the total charging duration, any delay in start of charging is disadvantageous since customer focus on charging makes perception of delays noticeable. This perception of start-of-charge delay on charging duration contrasts with the extended charging duration due to selection of a less efficient charging signal frequency of which the customer is normally unaware.

FIGS. 4A-4D

FIGS. 4A, 4B, 4C, and 4D are used to illustrate differing outcomes of the charging frequency determination mainly due to the coupling factor (k) which is unknown a priori to a charging session due to coil-to-coil misalignment, coil manufacture differences, and the coil-to-coil Z-gap variation.

FIG. 4A

Figure 4A:
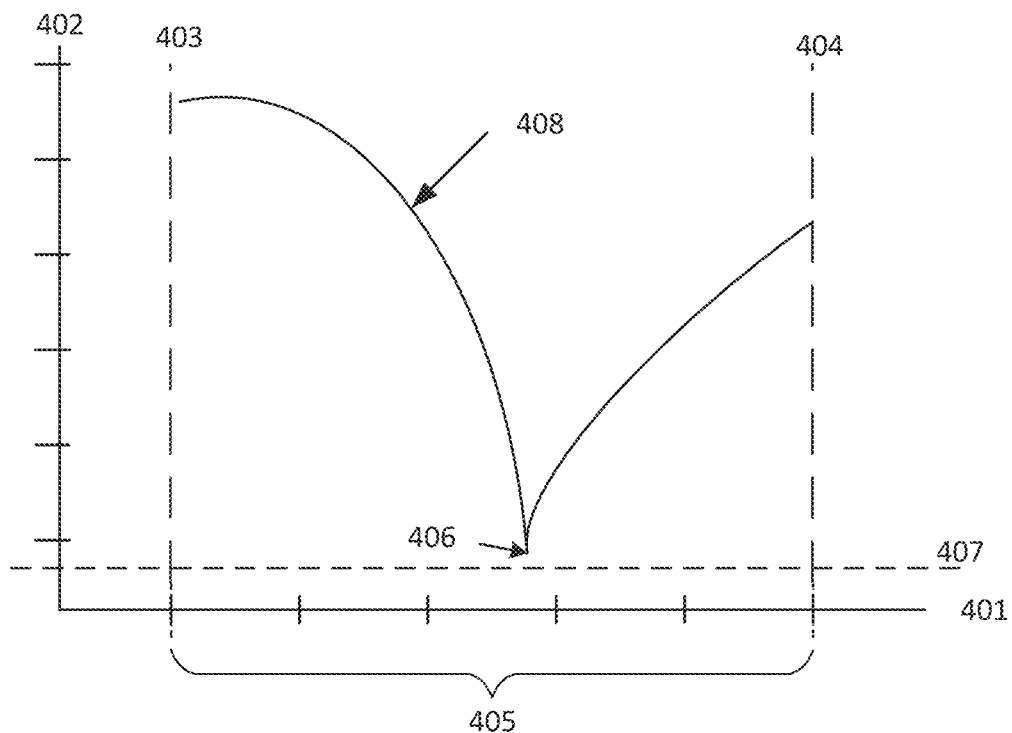
FIGS. 4A, 4B, 4C, and 4D illustrate measurement scenarios using the frequency determination procedure in an example configuration.

FIG. 4A graphically illustrates a scenario showing the GTA input current draw versus varied input signal frequency when the GTA input voltage is set to a fixed level and the associated VTA has its coil shunted. In the FIG. 4A scenario, the minimum GTA current 406 is above the limit of uncertainty 407 caused by precision of the current sense circuitry and therefore is the optimal frequency for WPT.

FIG. 4A has the x-axis 401 set as frequency and the y-axis 402 set as ground coil current. The lower frequency limit 403 and the upper frequency limit 404 are set by local regulation or international electromagnetic frequency allotments (e.g., SAE standard SAE J2954, where The WPT band centers at 85 kHz, and ranges from 81.38-90 kHz.) The WPT band 405 shown includes a back-off margin of 50 to 1000 Hz from the regulatory or statutory upper and lower frequency limits may be used to ensure that the power transfer signal does not exceed the allotted band. As illustrated, the GTA current curve 408 reaches a current minima above the uncertainty limit 407, which corresponds to the resonant frequency.

FIG. 4B

Figure 4B:
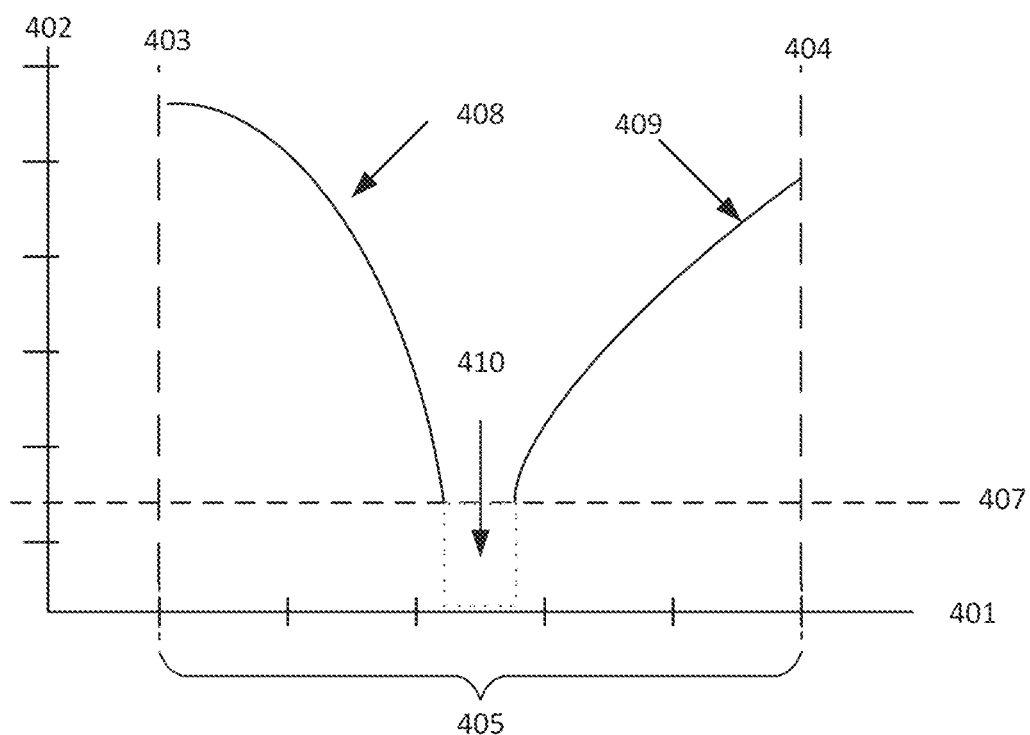

FIG. 4B graphically illustrates an alternative scenario showing the GTA coil input current draw versus varied input signal frequency when the GTA input voltage is set to a fixed level and the associated VTA coil is shunted and where the minimum GTA coil current cannot be unambiguously determined.

FIG. 4B has the x-axis 401 set as frequency and the y-axis 402 set as ground coil current. The WPT band 405 has lower frequency limit 403 and the upper frequency limit 404 are set by local regulation or international electromagnetic frequency allotments (back-off margins not shown). A first GTA current curve 408 can be determined for the lower range of polling frequencies, and second GTA current curve 409 can be determined for the upper range of frequencies, but the minima of the GTA current cannot be directly determined as it below the current sensor sensitivity threshold 407, resulting in a zone of ambiguity 410 where the GA current cannot be determined. Since the GTA current minimum cannot be directly measured, estimation techniques can be applied to find an efficient, if not optimal, WPT transfer frequency.

FIG. 4C

Figure 4C:
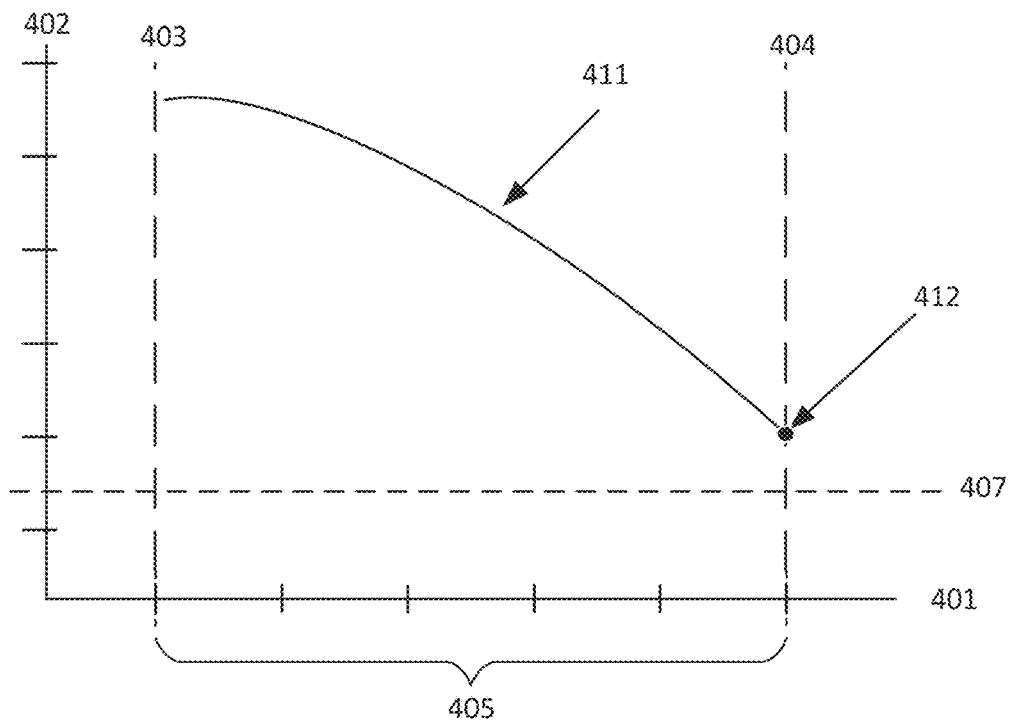

FIG. 4C graphically illustrates an alternative scenario showing the GTA coil input current draw versus varied input signal frequency when the GTA coil input voltage is set to a fixed level and the associated VTA coil is shunted.

FIG. 4C has the x-axis 401 set as frequency and the y-axis 402 set as GTA coil current measurement. The lower frequency limit 403 and the upper frequency limit 404 are set by local regulation or international electromagnetic frequency allotments, plus a back-off margin, for a WPT band 405A GTA current curve 411 can be determined for the range of polling frequencies. Since the measured GTA current minimum 412 is at the upper frequency boundary 404, the optimal WPT frequency cannot be unambiguously determined and the WPT cannot be allowed to emit beyond the allowed WPT band 405 so the minimum frequency 412 is reported for use as the most efficient frequency determined.

FIG. 4D

Figure 4D:
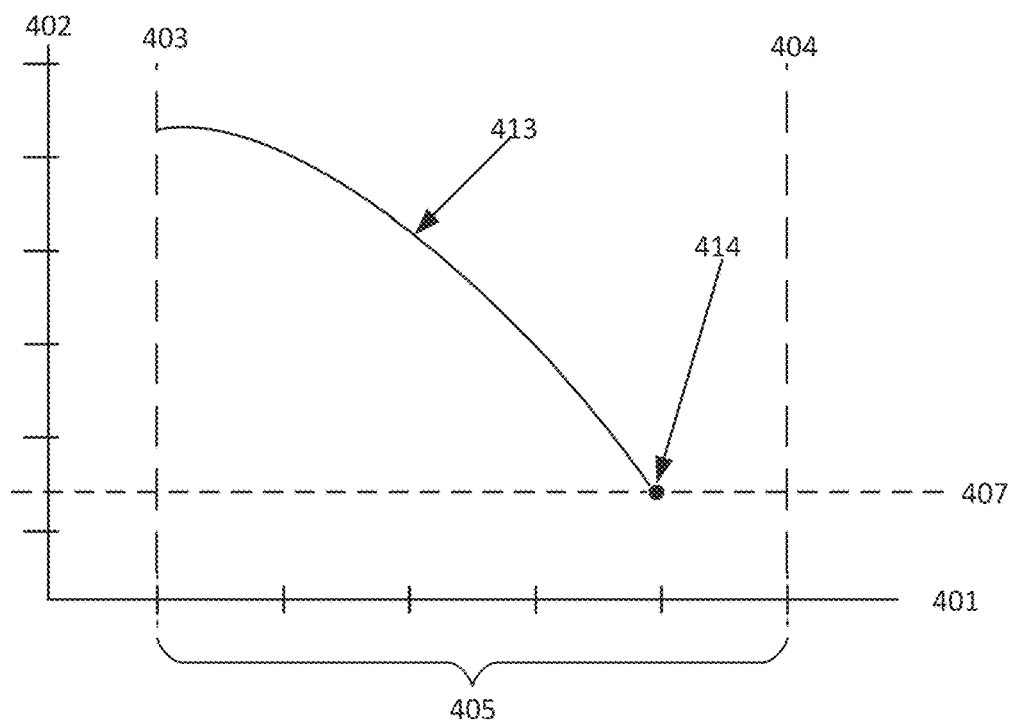

FIG. 4D graphically illustrates an alternative scenario showing the GTA coil input current draw versus varied input signal frequency when the GTA coil input voltage is set to a fixed level and the associated VTA coil is shunted.

FIG. 4D has the x-axis 401 set as frequency and the y-axis 402 set as GTA coil current. The lower frequency limit 403 and the upper frequency limit 404 are set by local regulation or international electromagnetic frequency allotments. A partial GTA current curve 413 can be determined for the range of polling frequencies. Since the measured GTA current minimum 414 is at the measurement uncertainty threshold 407, the optimal WPT frequency cannot be unambiguously determined. The measured GTA current minimum 414 is the most efficient frequency discovered and can be used in the subsequent charging session.

Alternately, a calculation approach can be used to project the partial GTA current curve 413 (either linear project or curve fitting based on the polled current, frequency points collected along the measured curve 413) to find the intersection of the curve 413 with the x-axis 401 (i.e. zero current). If the calculated x-axis intersection point is within the upper frequency bound 404, then the frequency of the calculated x-axis intersection point may be reported as the most efficient frequency.

FIG. 5

Figure 5:
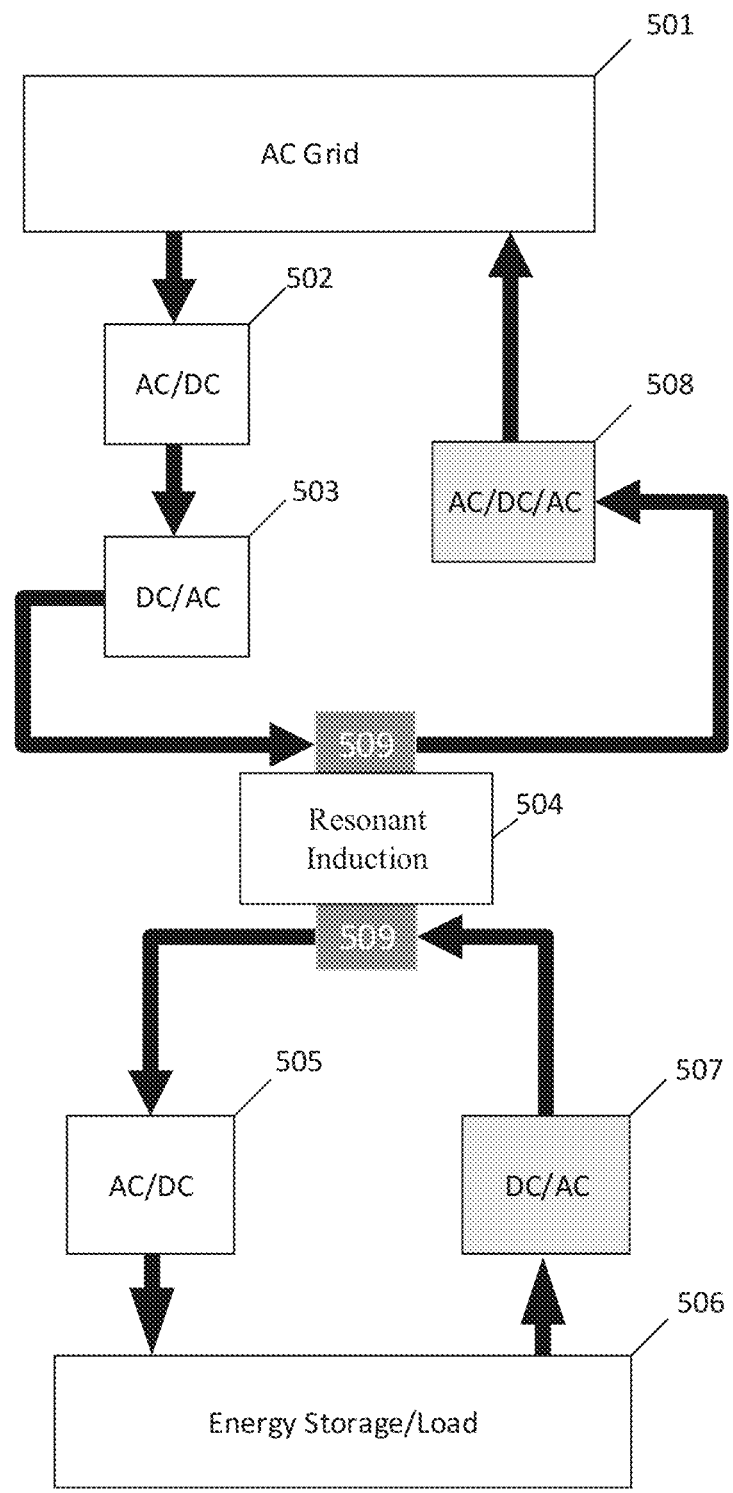
FIG. 5 illustrates the major components and subsystems for a bi-directional wireless power transfer system in a sample configuration.

FIG. 5 illustrates an exemplary high-level functional diagram for power flow through and conversion by a bidirectional wireless power transfer (WPT) system in a sample configuration.

While certain components are by nature bi-directional and symmetric in operation (e.g., the resonant induction circuit also known as an the open core transformer) and can be shared, the forward (charging) and reverse (discharging) power transmission paths will depend on divergent simplex architectures, requiring switches 509, control logic (not shown), and communications link (also not shown) to activate and complete the power transmission paths for each of the forward (charging) and reverse (discharging) use scenarios. Presented here as both the forward and reverse paths, a WPT can be implemented (and optimized for) using only one (nominally the forward) path.

In the forward direction, power is nominally delivered from the utility grid 501. Dependent on the grid connection, the power may be single phase alternating current (AC), direct current (DC), or multi-phase alternating current. The utility grid 501 includes any transformers needed to step down voltages from high voltage transmission lines. In this example, single phase AC is delivered by the utility grid 501, where a sufficient capacitance exists so that the power factor is adjusted to approximately 1 (unity).

The AC power may be converted to DC by the AC/DC converter 502. This function can be achieved by an active (switch-based) or passive (diode-based) rectifier. The DC/AC converter 503 takes the input DC power and converts it to a high frequency AC (nominally 85 kHz in this example) sinusoidal signal. The DC/AC conversion operation by the DC/AC converter 503 can be accomplished using an inverter.

The AC power signal may be passed to the coupling, a resonant air core transformer 504, with its primary and secondary coils. The AC power is converted to magnetic flux in the primary which is inductively coupled with the secondary. The secondary coil converts the received magnetic flux into an AC power signal. The AC power signal is passed to an AC/DC converter 505. The AC/DC conversion function can be achieved by an active (switch-based) or passive (diode-based) rectifier.

The resultant DC signal is used to charge the energy storage device 506, nominally a rechargeable chemical battery, but also could be a one or more of a capacitor bank, reversable fuel cell, solid state battery or a hybrid combination of the aforementioned. The DC signal can also be used to power an electrical device directly. Being bidirectional, the energy storage device 506 can output stored power as direct current to the reverse transmission path. The DC power is converted by the DC/AC inverter 507 to the necessary AC power signal.

This AC power signal is input into the resonant induction circuit 504. In this reverse path scenario, the coils are reversed in operation from the forward path. The AC power is converted to magnetic flux in the primary coil of the open core transformer 504 which is inductively coupled with the secondary coil. The secondary coil converts the received magnetic flux into an AC power signal. The resultant AC power is adjusted in frequency by the AC/AC converter 508. In one configuration, an AC/DC/AC converter is used as the AC/AC converter 508, where the AC/AC frequency adjustment operation is accomplished using an AC/DC rectifier and then converted from DC to AC at the required frequency by an inverter circuit. The utility grid 501 in this example includes the necessary transformers to translate the AC power to the desired voltage and AC/DC conversion, if necessary, for interfacing with utility supplied power.

In an alternative configuration, the case where a DC utility feed is available from the DC utility grid (not shown), the DC/AC converter 503 can be sized to accept a DC feed directly, omitting need for the prior AC/DC stage 502.

FIG. 6A

Figure 6A:
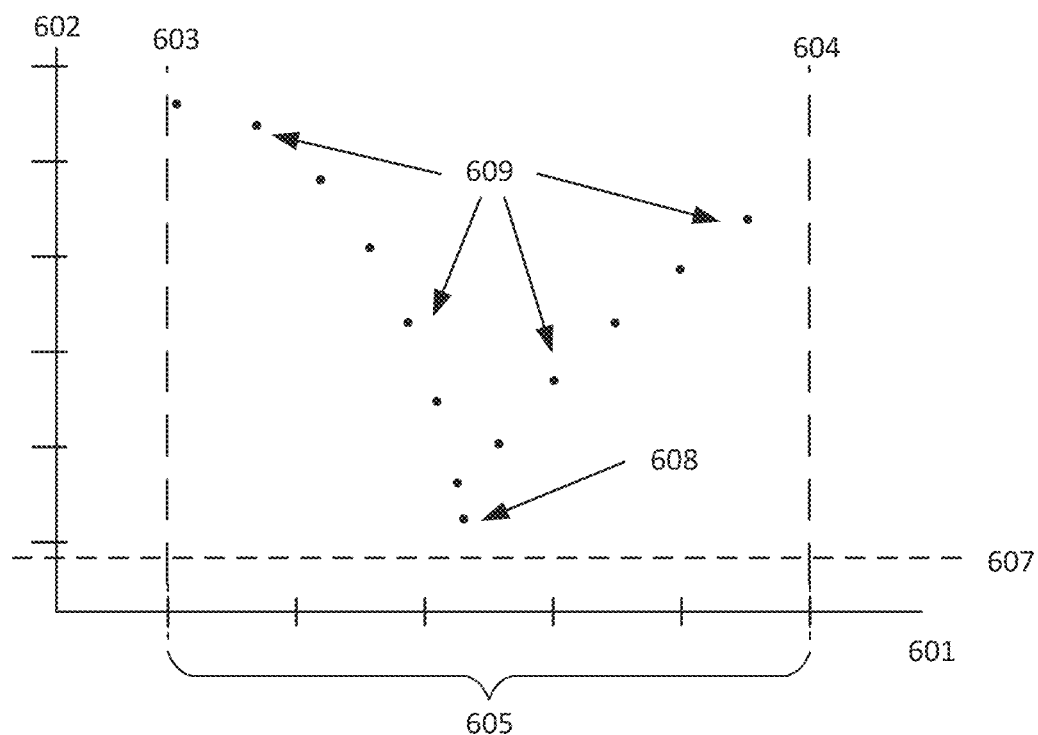
FIGS. 6A and 6B illustrate the first and second stages of a frequency determination procedure in a sample configuration.

FIG. 6A graphically illustrates a scenario showing the GTA coil input current draw versus GTA coil input current signal frequency when the GTA coil input voltage is set to a fixed level and the associated VTA coil is shunted in a first stage of resonant frequency determination. In FIG. 6A, the GTA coil input current signal is tuned to a small number of pre-selected frequencies to determine a frequency range of interest for closer examination. These pre-selected frequencies can be applied in order to maximize search efficiency for determining the input current minimum if pre-existing data is available. For instance, a random set of frequencies can be applied. A set of frequencies centered on the resonant frequency can be applied. A widely spaced first set of frequencies can be applied and a focused second set applied around the frequency, from the first frequency set, resulting in the minimum input current to the GTA.

FIG. 6A has the x-axis 601 set as frequency and the y-axis 602 set as GTA coil current. The lower frequency limit 603 and the upper frequency limit 604, resulting in a WPT band 605, may be set by local regulation or international electromagnetic frequency allotments or may be a smaller, potentially offset from the center frequency, range based on prior experience with the GTA/VTA pairs involved. The GTA current sensor limit of accuracy 607 is shown. The GTA current measurements 609 are taken by adjusting the GTA input frequency with a static GTA input voltage set to a fraction (%) of the total potential. In this example, the lowest GTA current measurement 608 is above the current sensor uncertainty threshold and is reported at the resonant frequency to be used during the charging session.

If a two-stage efficient frequency determination process is used, then to shorten the time needed to complete the first stage only a few polling frequencies will be used over the entire frequency band delineated by the lower 603 and upper 604 frequency bounds. In one example, the pre-selected frequencies are applied only until a minima (a minimum GTA current) is detected, i.e., a measurement bracketed by a first measurement at a higher frequency, with a higher GTA current and at second measurement at a lower frequency also with a higher GTA current.

FIG. 6B

Figure 6B:
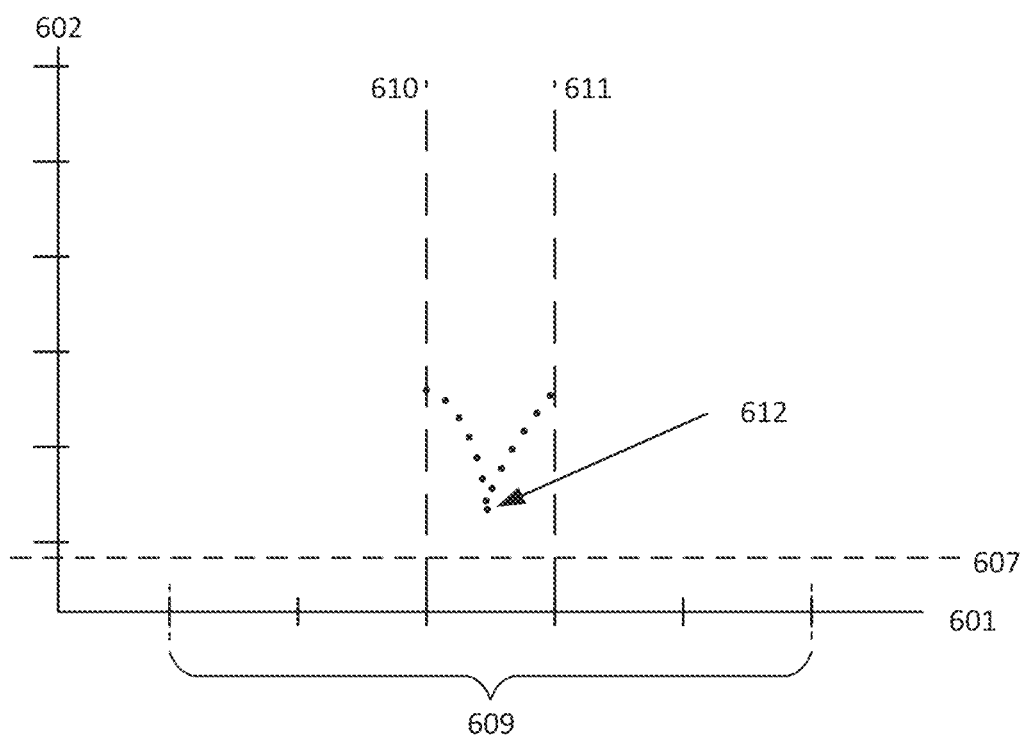

FIG. 6B illustrates the second stage of a 2-stage resonant frequency determination. The x-axis 601 shows frequency of the GTA current input, while the y-axis 602 shows the GTA coil current at a set input voltage. In this second stage, the lower frequency constraint 610 and upper frequency constraint 611 have been narrowed based on the GTA current minima 608 found in the first stage and all frequency polling takes place within those constraints 610, 611. The VTA geometrically corresponding to the GTA under test is shunted while the GTA value is set at a fixed level.

In one example, the constraints 610, 611 are set to the two frequency polling points with the lowest GTA current measurements determined in the first stage. In another example, the constraints 610, 611 are set to the two frequency polling points adjacent to the frequency polling point with the minimum GTA current found in the first stage polling.

The stage 2 frequency polling takes place between the frequency constraints 610, 611 using a selected set of frequencies. The frequency set may be selected to minimize frequency determination duration which delays the start of charging, increasing the overall charging time. The frequency 612 with the lowest GTA current above the uncertainty threshold 612 is reported as the efficient WPT frequency.

In some charging sessions, where the GTA, VTA and EV characteristics are well known (for instance due to the EVs prior use of the GTS), the stage 2 frequency determination may be initiated without stage 1 since the resonant frequency can be expected to be confined to a narrower expected range of frequencies.

FIG. 6C

Figure 6C:
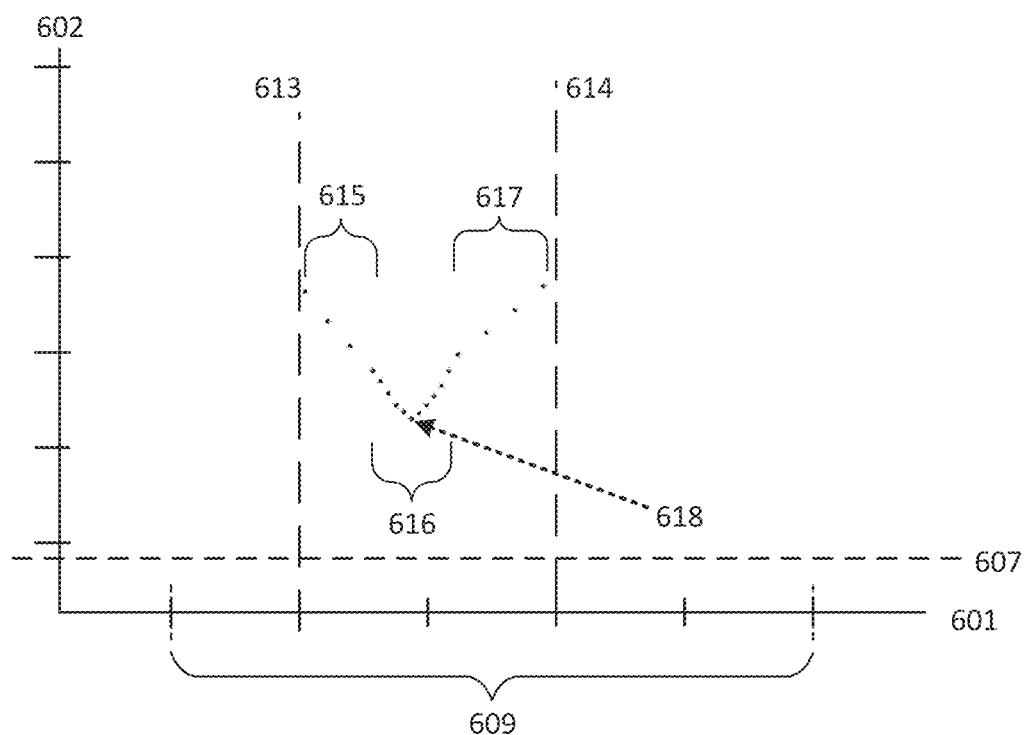
FIG. 6C illustrates the ability to set multiple frequency polling maps in the same efficient frequency determination in a sample configuration.

FIG. 6C illustrates the ability to set multiple frequency polling maps in the same efficient frequency determination in a sample configuration. FIG. 6C has the x-axis 601 set as frequency and the y-axis 602 set as GTA coil current. The lower frequency limit 613 and the upper frequency limit 614, resulting in a WPT band of 609, may be set by local regulation or international electromagnetic frequency allotments or may be a smaller, potentially offset from the center frequency, range based on prior experience with the GTA/VTA pairs involved. The GTA current sensor limit of accuracy 607 is shown. In this example, three frequency maps 615, 616, and 617 are set, each with a measurement distribution determined from the probability of the GTA current minima being within a map's frequency range. GTA current measurements are taken by adjusting the GTA input frequency in increments of the total potential.

In the FIG. 6C example, a GTS current minima 618 is found within the middle frequency map 616 and that frequency is reported as the efficient WPT frequency.

FIG. 7A

Figure 7A:
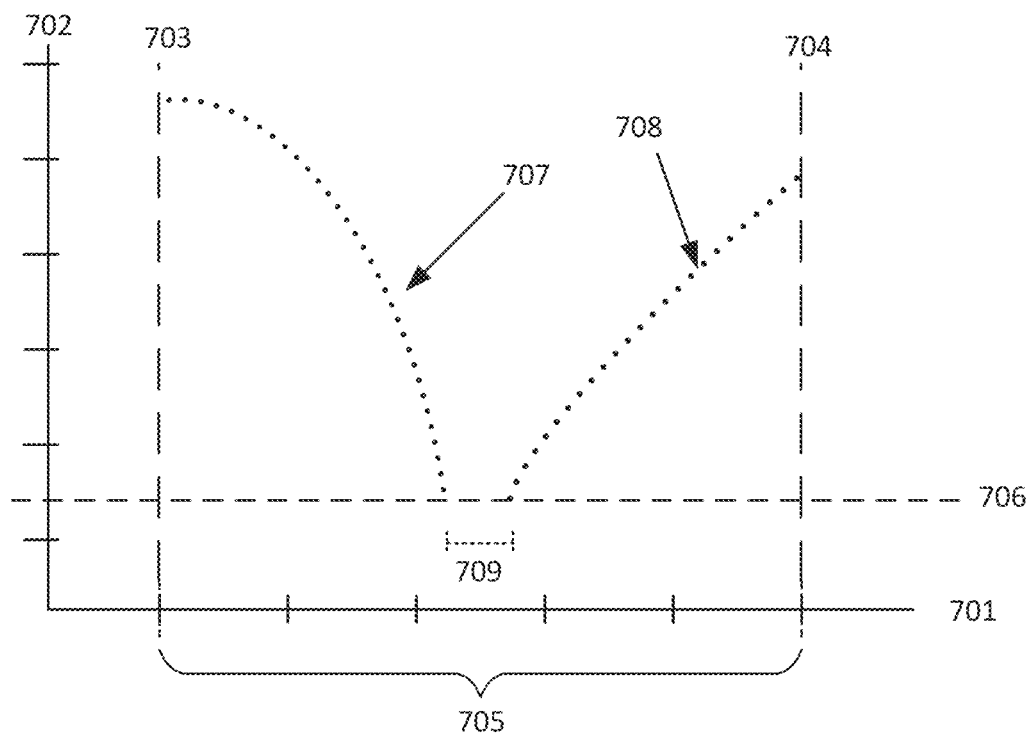
FIGS. 7A and 7B illustrate methods for selection of an efficient frequency when a resonant frequency cannot be found deterministically.

FIG. 7A illustrates a scenario for efficient WPT frequency determination when the GTA current minima is ambiguous.

The x-axis 701 shows frequency of the GTA current input, while the y-axis 702 shows the GTA coil current at a set input voltage. Above the current uncertainty limit 706, the GTA current versus frequency response is segmented into a lower response curve 708 and an upper response curve 709. The GTA voltage is set to a fraction of the available voltage and the geometrically corresponding VTA coil is shunted. A region of ambiguity 711 exists between the measured upper response curve 709 and the measured lower response curve, therefore the efficient WPT frequency cannot be directly determined by measurement. In the example shown in FIG. 7A, one solution is selection of a point within or bordering the region of ambiguity 711.

FIG. 7B

Figure 7B:
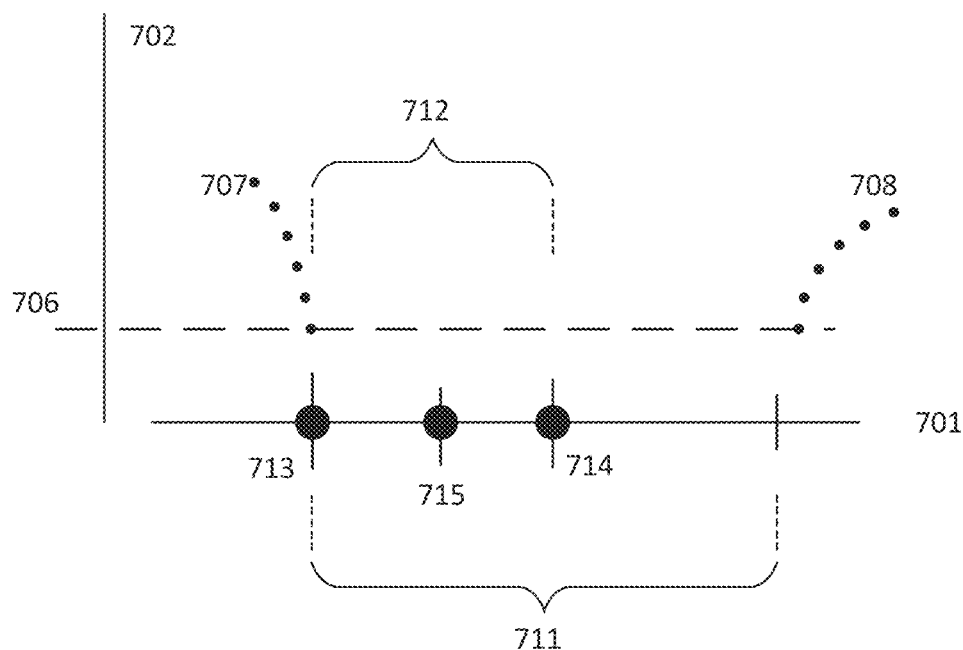

FIG. 7B shows selection of a WPT frequency from the region of ambiguity 711. The x-axis 701 shows frequency of the GTA current input, while the y-axis 702 shows the GTA coil current at a set input voltage. Above the current uncertainty limit 706, the GTA current versus frequency response is segmented into a lower response curve 707 and an upper response curve 708. The region of ambiguity 711 is further subdivided into a lower ambiguous frequency band 712.

One selection option is for selection of the highest frequency point 713 on the lower response curve 708. Another option, as shown in FIG. 7B, is estimation using projection of the lower response curve 708 and upper response curve 709. Selection of this point 713 is as accurate an efficient WPT frequency as can be determined by measurement.

Another option for selection of an efficient WPT frequency is using the mid-point frequency 714 of the region of ambiguity 711. While not being directly measurable, it is probable that the midpoint frequency 714 is closer to the resonant frequency than those at valid, measurable frequencies.

Another frequency selection option requiring more calculation is to use the known asymmetry of the GTA versus frequency curve to report an efficient WPT frequency taken from the lower ambiguous frequency band 712 which extends from the highest measured frequency of the lower current response curve 708 to the midpoint of the region of ambiguity. The frequency may be selected here as a percentage of the width of the lower ambiguous frequency band 712.

FIG. 7C

Figure 7C:
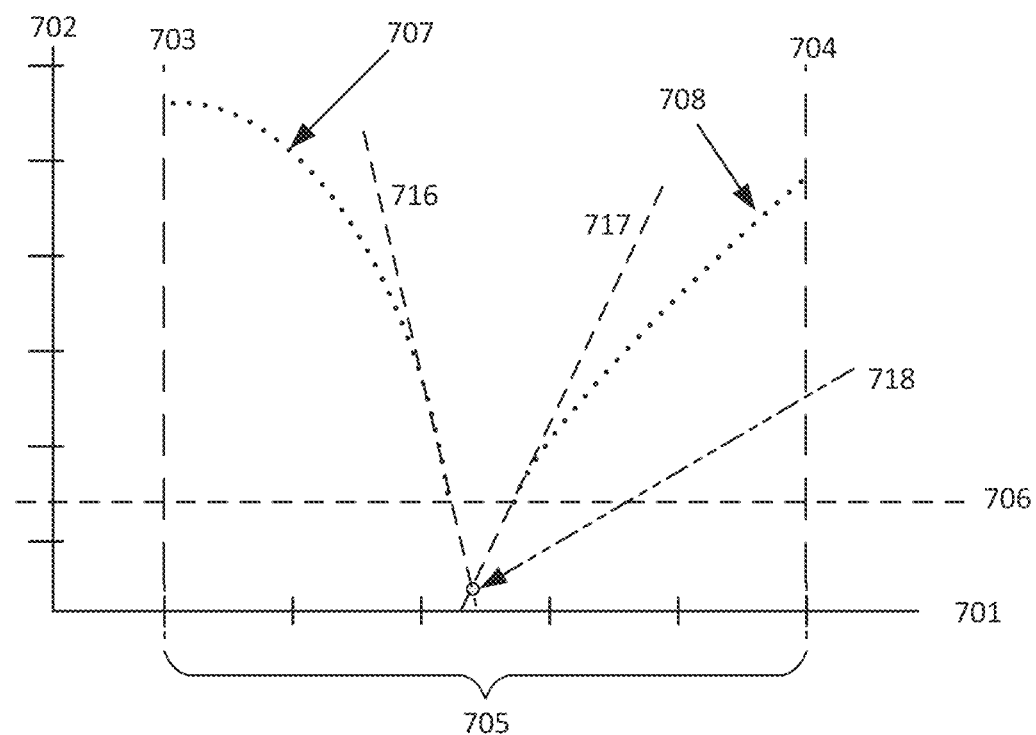
FIGS. 7C and 7D illustrates methods for estimation of an efficient frequency when a resonant frequency cannot be found deterministically.

In FIG. 7C, the resonance frequency cannot be directly measured, and a projection technique is used to determine an efficient frequency. The VTA coil is shunted and the GTA input voltage is set to a fixed amount. The x-axis 701 shows frequency of the GTA current input, while the y-axis 702 shows the GTA coil current at a set input voltage. Above the current uncertainty limit 706, the GTA current versus frequency response is segmented into a lower response curve 707 and an upper response curve 708. Since the GTA current minimum is ambiguous, a lower linear projection 716 based on the measurements from the lower response curve 707 is calculated. Similarly, an upper linear projection 717 based on the measurements from the upper response curve 708 is calculated. The intersection of the two projections 716 and 717 is intersection point 718, the frequency of which is reported as the efficient WPT frequency.

Alternately if the intersection of the two projections 716 and 717 is below 0.0 Amps of GA current (below x-axis 701), then the process may be aborted and an efficient frequency selection is made. Alternately, if the intersection of the two projections 716 and 717 is above 0.0 Amps of GA current (above the x-axis 701), and sufficient processing capability and delay time is available, a secondary projection technique can be used. In the specific example shown in FIG. 7C, the slope of each projection 716, 717 is based on the lowest (in GA current) points of the response curves 707 708 or alternately using the average of the three frequencies polled adjacent to the uncertainty of measurement threshold 707 for each response curve 707 708. The intersection 718 of the projections 711, 712 is the estimated efficient frequency.

FIG. 7D

Figure 7D:
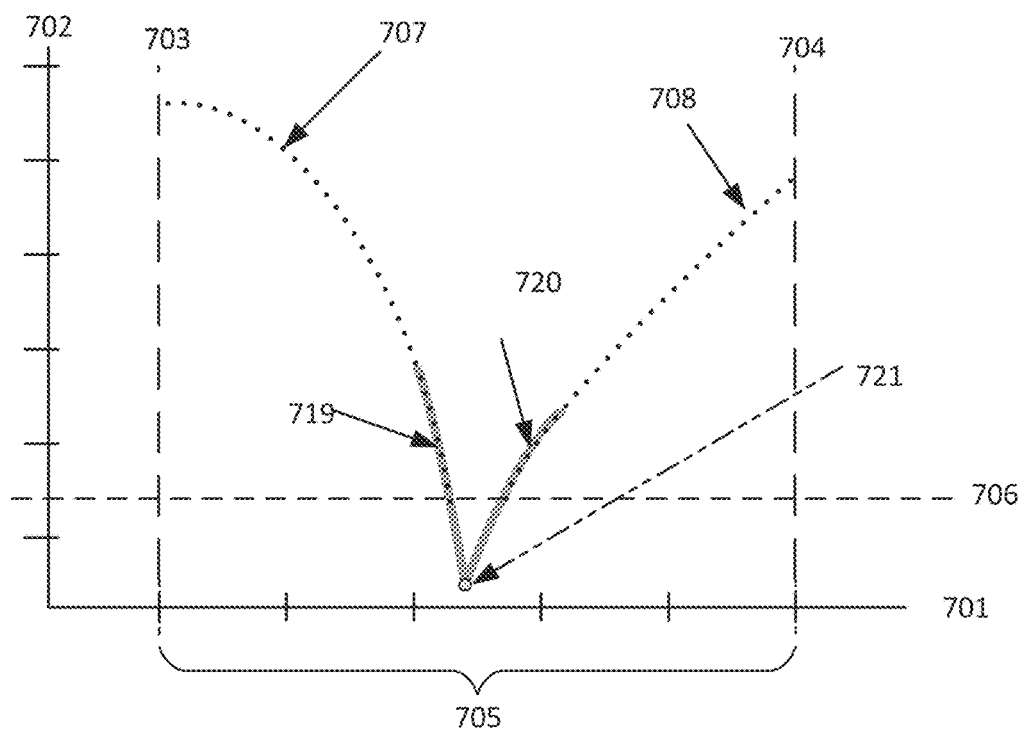

FIG. 7D details a selection method for determining an efficient GTA frequency for WPT when the resonant frequency cannot be directly determined via measurement. No valid GTA current measurement exists below the threshold of current uncertainty 706. The x-axis 701 is the GTA input frequency while the GTA input current is shown by the y-axis 702. A frequency band 705 is defined by a lower bound 703 and an upper bound 704. The GTA current measurements are shown divided into a lower 707 response curve and an upper response curve 708, both terminating at the threshold of current uncertainty 706.

To overcome the lack of direct measurement of a minimal GTA current, a lower fitted curve projection 719 based on the measurements from the lower response curve 707 is calculated. Similarly, an upper fitted curve projection 720 based on the measurements from the upper response curve 708 is calculated. The intersection of the projected curves 719 and 720 has a frequency of the intersection which is reported as the efficient WPT frequency.

Alternately, if the intersection of the projected curves 719 and 720 is below 0.0 Amps (below the x-axis 701), then the projection may be aborted, and an efficient frequency selection is made.

Recalculation using an alternative means (using an alternative curve fitting algorithm or linear projection) may be done if the GA current cannot be calculated or is calculated to be negative. Note however, such additional processing could lead to delays in the start of charging and thus the overall charging session duration.

FIG. 8

Since the accuracy of estimation of the resonant frequency is vital to wireless power efficiency and thus lowering of detrimental heating and harmonic radio frequency emissions at high power, a multi-pass estimation may be used.

Figure 8:
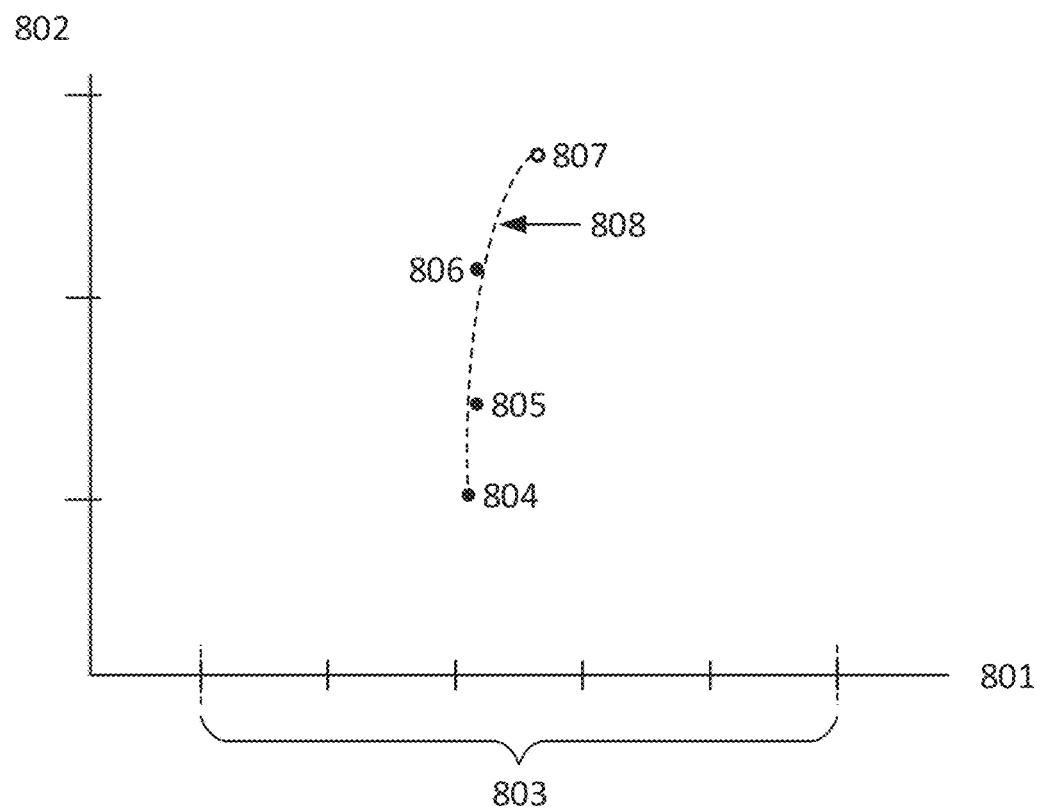
FIG. 8 illustrates the result of a multi-pass implementation of the frequency determination procedure in a sample configuration.

In FIG. 8, the results of a multi-pass estimation are shown. The x-axis 801 shows frequency, while the y-axis 802 shows GTA current. The previously described frequency determination is carried out four times in this example staying within the legal or regulatory frequency band 803. In the first pass, the GTA voltage is set to a specific point (e.g., 10% of full or requested power) resulting in a resonant frequency estimate 804 at a measured or estimated minimum GTA current. On each pass, the GTA voltage is changed (increasing in this example), resulting in a second frequency estimate 805 at 20% power, and a third frequency estimate 806 at 30% power. With sufficient (three or more) frequency measurement passes, a relationship depicted here by a curve 808 between power level and resonant frequency can be derived and the frequency 807 at full (or requested) power be calculated.

FIG. 9

Figure 9:
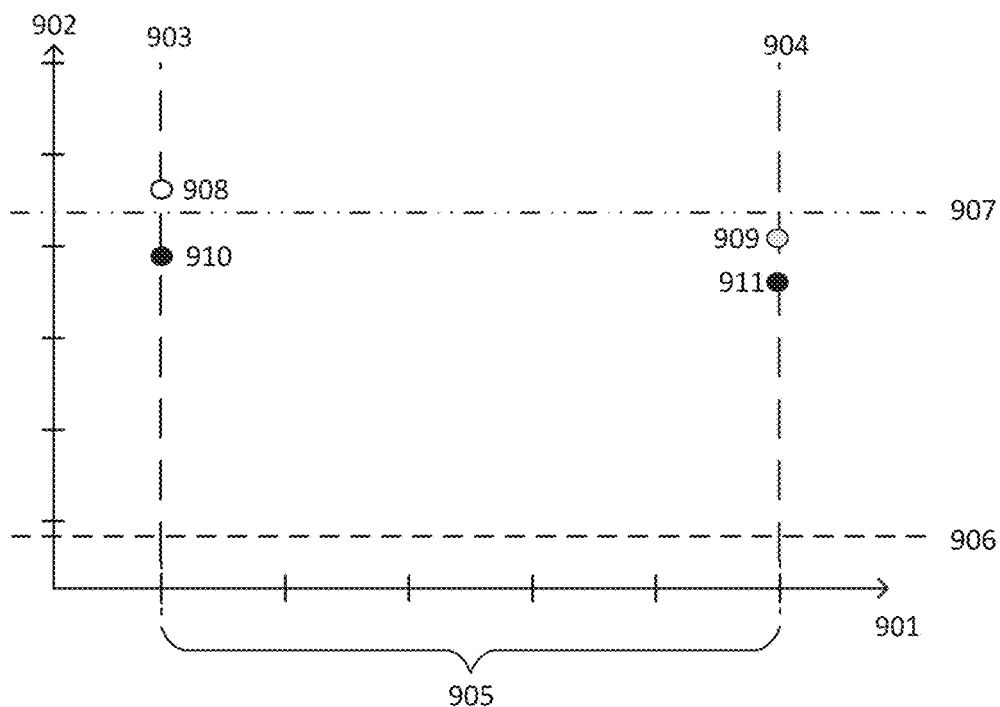
FIG. 9 graphically illustrates the parameters and results of a safety procedure dealing with over-coupled inductive coils.

FIG. 9 illustrates a precautionary measure to avoid GTA overcurrent due to over-coupling between the GTA and the paired VTA during or prior to the resonant frequency determination procedure.

The x-axis 901 shows the GTA input frequency while the y-axis 902 shows the GTA current. The VTA coil is shunted during this operation while the initial GTA input voltage is fixed at a percentage of the full or requested power transfer level. The GTA input frequency is constrained by the lower 903 and upper 904 frequency bounds, resulting in a frequency search band 905. The uncertainty threshold of current sensing 906 is shown as is the maximum allowable GA current limit 907 for the resonant frequency determination procedure.

A first current measurement 908 is made at the lower frequency boundary 903. If the first GTA current measurement 908 is above the maximum current limit 904, then the GTA may either abort the resonant frequency determination procedure or resume the procedure after lowering the fixed GTA input voltage level. A second GTA current measurement 909 can optionally be made at the upper frequency boundary 904 at the initial GTA voltage, but the asymmetry of the coupling factor shows that the first GTA current measurement 908 at the lower frequency bound 903 will typically be higher than the second GTA current measurement 909 made at the upper frequency bound 904. The second 909 frequency point current measurement can be performed to show the need for the controller to direct the system to use even a lower fixed voltage to restart the measurement process (e.g., drop from 30% of voltage range to 15% of voltage range rather than restart polling at 20% of the voltage range).

The GTS may lower the fixed GTA voltage and re-initiate the frequency determination procedure. The VTA coil is still shunted. If the subsequent measurement 910 at the lower frequency boundary 903 is lower than the GTA current safety limit 907, then an optional subsequent second GTA current measurement 911 can be made at the upper frequency bound 904 to doublecheck that the GTA current is under the safety limit for the entire frequency band.

FIG. 10

Figure 10:
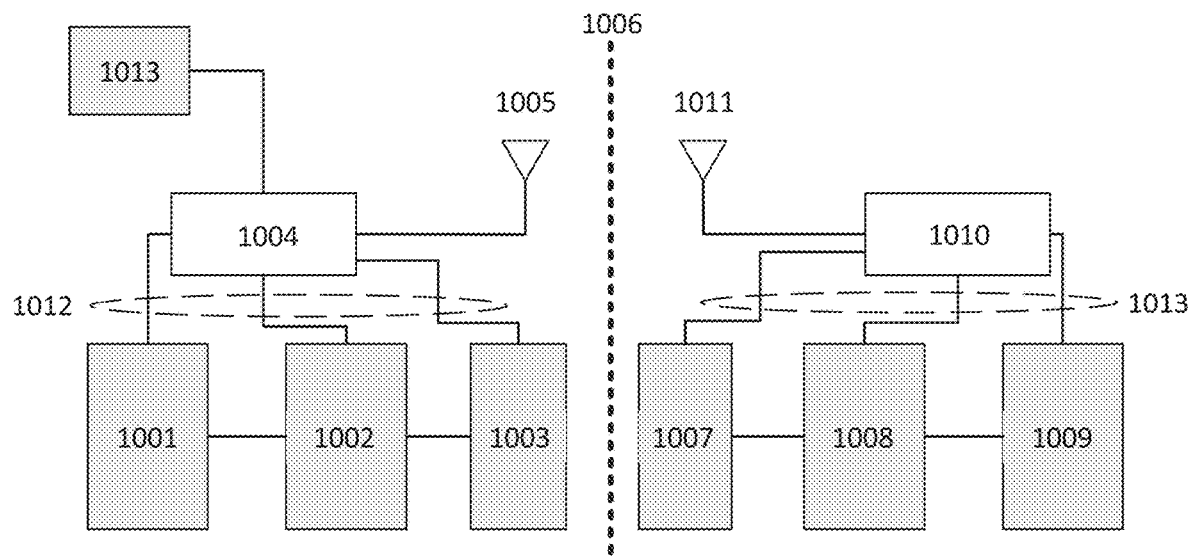
FIG. 10 illustrates the major subsystems and communications paths within a WPT in a sample configuration.

FIG. 10 depicts the major subsystem components of a WPT system for EV charging.

The first subsystem 1001 includes the source of energy (e.g., the utility grid) and Power Factor Correction (PFC) hardware. The first subsystem 1001 sends power to the Inverter subsystem 1002 which includes the AC/DC converter and inverter. In the Inverter subsystem 1002, the output AC current can be measured using current sensor (e.g., a Rogowski Coil, Split-core current sensors, solid-core current transducers, Hall effect sensors (either open or closed-loop)). Each current sensor type has a precision level based on its design, e.g., the current sensor provides a sufficient level of measurement accuracy that is defined across the entire frequency band of interest. Each measurement, regardless of current sensor type, is degraded by factors affecting uncertainty including, for example, output noise, quantization error, temperature variability, conductor position, impinging external magnetic fields, magnetization, and common-mode voltage for the current sensor. A limit of uncertainty in current measurement therefore exists for any current sensor selected.

The Inverter subsystem 1002 feeds an AC signal to the primary assembly subsystem 1003 including the primary compensation network (i.e., resonant capacitors) and the primary/transmitter inductive coil (Tx).

The ground-side controller 1004 oversees the ground-side subsystems 1001, 1002, and 1003 via a network of control and monitoring data lines 1012. The ground-side controller not only monitors status and alarms, but also controls the inverter 1002 power level and frequency for the AC signal to the primary assembly 1003. The ground-side controller 1004 also may communicate with external control and data systems (not shown).

Installed in the EV, the secondary/receiving coil (Rx) and secondary compensation network 1007 sends the AC power signal to the rectifier 1008, which delivers the resulting DC power to the filter and the battery subsystem 1009. The EV-side controller 1010 oversees the EV-side subsystems 1007, 1008, and 1009 via a network of control and monitoring data lines 1013. The ground-side controller 1010 also controls the rectifier switching frequency when the rectifier 1008 uses active rectification.

Both the transmitted power and duplex communications between the ground charger and EV pass over an air gap 1006. In this example, short-range loop antennas 1005 and 1011 are used for data signal transmission over the air gap 1006.

In such a configuration, the ground-side controller 1004 may include a processor that is programmed to implement the charging frequency determination techniques described herein.

The station or depot controller 1013 is connected to the ground-side controller 1010. The station controller 1013 allows coordination between GTSs and is the local storage unit for EV information which can include the magnetics profile. The station controller 1013 also may act as a gateway for secure communications for billing, diagnostics, and EV log uploads.

FIG. 11

Figure 11:
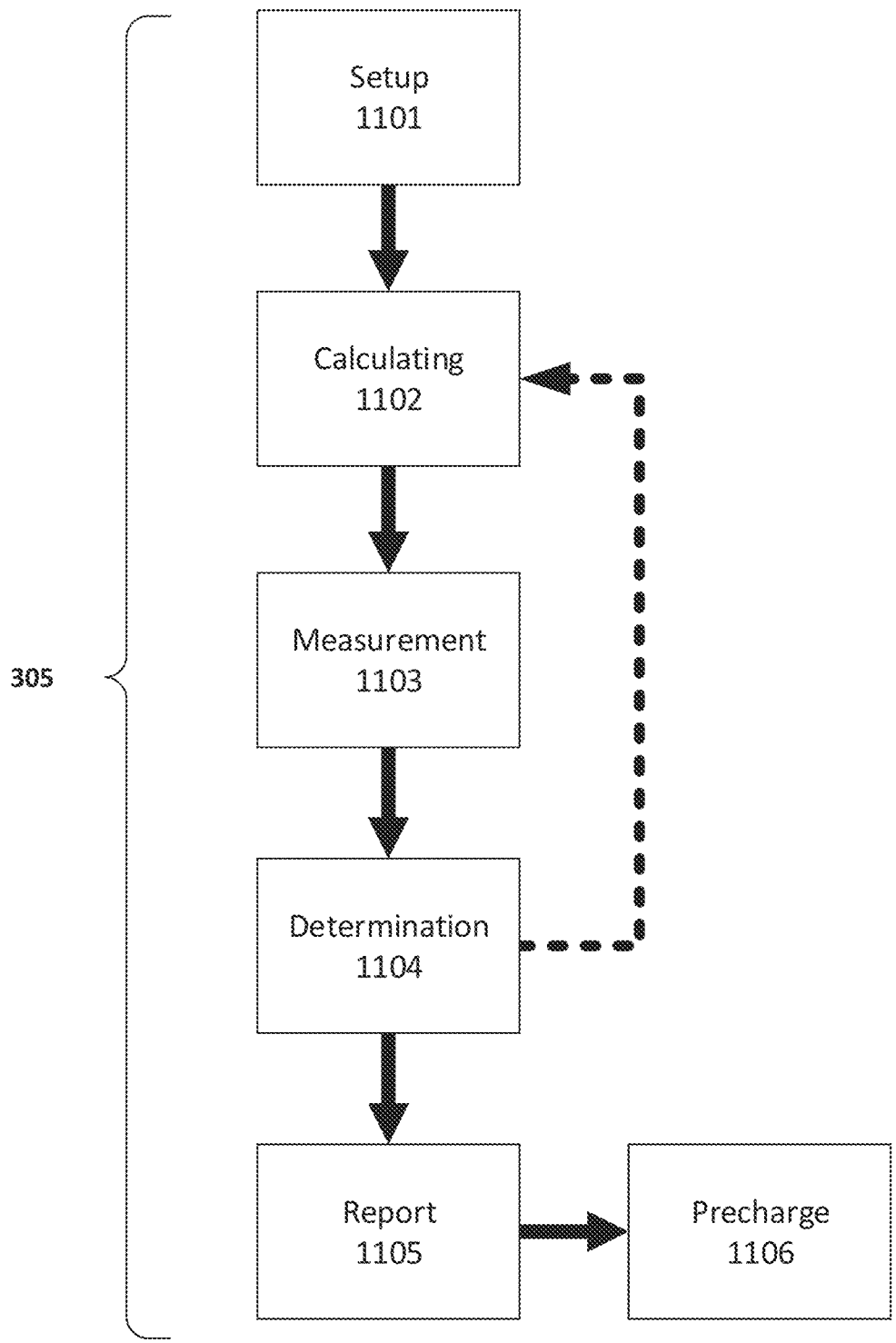
FIG. 11 illustrates a flow diagram expressing the steps of the charging frequency determination implemented by the ground-side controller in an example configuration.

FIG. 11 depicts flow diagram expressing the steps of the charging frequency determination implemented by the ground-side controller 1004.

In the initial Setup stage 1101, information about the vehicle's WPT (the vehicle's profile) is retrieved, via the wireless communications system, either from the vehicle or an external storage site. The WPT information can include, for each VTA, details on the make, model and manufacturer of the VTA, the magnetics characteristics of the VTA coil assembly, and details on previous charging experiences which can include the charging signal frequency used. If no VTA data is available, a default profile may be used and a new record file started for establishing a new profile.

The controller then calculates at Calculating stage 1102 the set GTA voltage to use, number of current measurements to take, and the frequency map (the number, order, and spacing frequencies at which to measure current).

Measurement stage 1103 includes shunting the VTA coil, applying the set voltage at the corresponding GTA input, and then applying AC current using the frequency map.

Determination stage 1104 can include calculation of a second measurement 1103 with a re-calculated frequency map. Determination stage 1104 may include the calculation of an efficient frequency when the resonant frequency cannot be determined in the allowed WPT bandwidth or above the current sensor uncertainty threshold.

In Report stage 1105, the measured resonant frequency or the calculated efficient frequency for the GTA-VTA pair is reported to the controller 1104, vehicle, and offset data repository(s) (if any).

In Pre-charge stage 1106, the VTA coil is unshunted, the GTA input tuned to the reported frequency, and the GTA voltage set to deliver the requested power to the VTA and thus the EV.

FIG. 12

Figure 12:
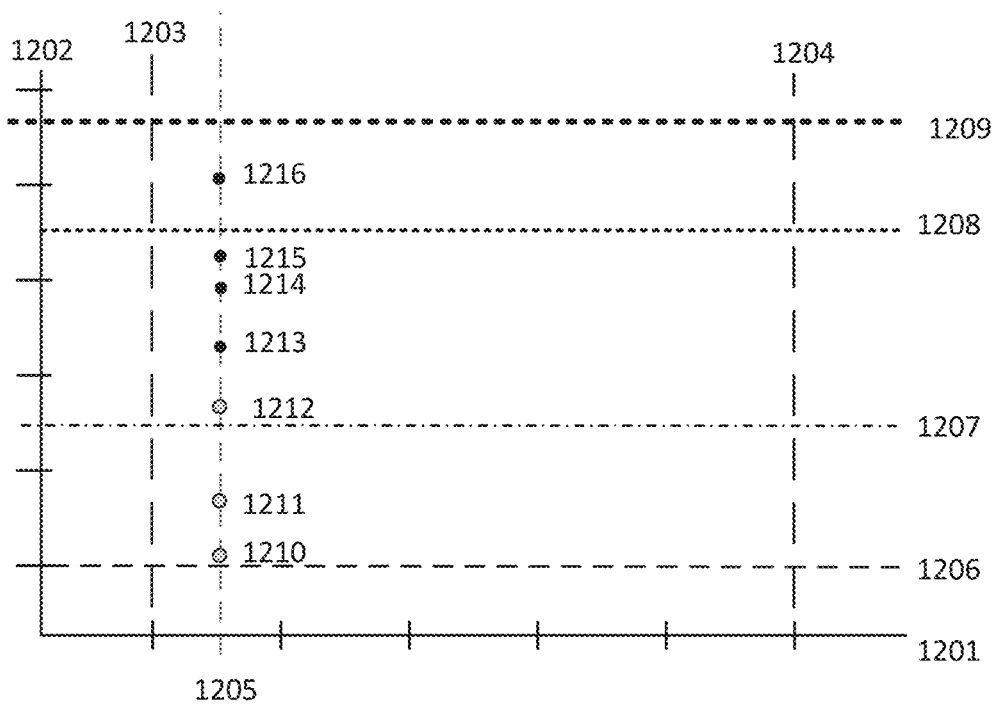
FIG. 12 illustrates a scenario for determining the fixed input voltage to the transmitting coil without harming the WPT electronics.

Rather than starting the efficient frequency determination procedure at a fixed GTA input voltage and varying the GTA current while the VTA coil is shunted, a more cautious method can be implemented that avoids prohibitively high currents in the GTA, such in the case when the GTA and VTA coils are unexpectedly over-coupled. FIG. 12 illustrates a scenario for setting the GA input voltage without harm to the GTA or coupled VTA WPT electronics.

The x-axis 1201 shows frequency of the GTA current input, while the y-axis 1202 shows the GTA coil current at a varied GTA input voltage, where 1203 is the lower frequency boundary and 1204 is the upper frequency boundary. Above the current measurement uncertainty limit 1206, the GTA current is shown in response to a series of GTA input voltages at a set frequency 1205. The VTA (not shown) geometrically corresponding to the GTA under test has its coil shunted for the duration of the test.

With GTA and VTA in alignment and the VTA coil shunted, the cautious method for reaching the normal GTS input test voltage starts with the GTA input voltage set to a first voltage (e.g., 0.0 volts). The GTA input voltage is increased in a series of incremental (a percent or fraction of the nominal test voltage) voltage steps. Once the GTA input current is above the limit of current measurement uncertainty 1206 and at each voltage step thereafter, the GTA current at a selected GTA voltage and set frequency is measured and compared to the GTA current guard threshold 1207, the safety margin threshold 1208, and the adversity threshold 1209.

GTA current measurements 1209, 1210, and 1211 resulting from the first GTA input voltage series are shown at the selected frequency 1205. The selected frequency 1205 may be selected at the lower frequency boundary 1203 to take advantage of the asymmetry of the coupling factor (k) effects on the GTA input current. This first series of voltages stops incrementing when either the nominal GTS test voltage is reached or (as shown in FIG. 12) a GTA current measurement 1212 above the guard threshold 1207 is produced in response to the GTA voltage input.

When the GTA current exceeds a guard threshold 1207, then the GTA input voltage increment is reduced and a second series of GTA input voltages are applied and the resulting GTA input currents 1213, 1214, and 1215 are measured. The second GTA voltage series is incrementally applied until either the nominal GTS test voltage is reached or a GTA input current measurement 1216 is above the safety margin threshold 1208. When a GTA input current measurement 1216 exceeds the safety margin threshold, the GTA input voltage at current measurement 121 is used as the test voltage and the efficient frequency determination procedure can begin.

In FIG. 12, a GTA input current measurement exceeding the adversity threshold 1209 is not shown. Such a current could be damaging to the GTA or cause damage to the corresponding VTA. Note that the safety margin threshold 1208 is set well below the adversity threshold 1209. If a GTA current measurement had exceeded the adversity threshold 1209, then the GTA input voltage at the prior step (where the resultant current was measured below the adversity threshold) 1209 would be reported as the GTA test voltage to be used in the efficient frequency determination procedure.

CONCLUSION

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another example discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample configurations.

The functions described herein with respect to FIGS. 1-11 may be implemented in software in one configuration. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the configurations described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that while the disclosure contained herein pertains to the provision of electrical power to vehicles, it should be understood that this is only one of many possible applications, and other examples including non-vehicular applications are possible. For example, those skilled in the art will appreciate that there are numerous applications where customers wait in queues and it is desired to provide charging to customer electronic devices as the customer moves through the queue. For example, inductive portable consumer electronic device chargers, such as those (e.g., PowerMat™) used to charge toothbrushes, cellular telephones, and other devices may be managed as described herein. Accordingly, these and other such applications are included within the scope of the following claims.

What is claimed:

1. A method for determining a charging frequency between a transmitting coil and a receiving coil of a wireless power transfer (WPT) system, comprising:
   setting an input voltage to the transmitting coil at a fixed voltage;
   shunting the receiving coil;
   determining a first input current frequency range in which a resonant frequency is expected to be found;
   frequency polling within the first input current frequency range using a set of polling frequencies in the first input current frequency range; and
   selecting as the charging frequency a polling frequency having a lowest input current.

2. The method as in claim 1, wherein determining the first input current frequency range in which the resonant frequency is expected to be found comprises:
   setting the first input current frequency range based on at least one of regulation, international electromagnetic frequency allotments, or prior experience with WPT between the transmitting coil and the receiving coil.

3. The method as in claim 1, wherein frequency polling within the first input current frequency range comprises:
   determining an input current minimum at the set of polling frequencies;
   determining a second input current frequency range around the input current minimum that is narrower than the first input current frequency range; and
   frequency polling within the second input current frequency range using a second set of polling frequencies in the second input current frequency range.

4. The method as in claim 3, wherein determining the second input current frequency range around the input current minimum comprises:
   determining two polling frequencies in the set of polling frequencies with the lowest input currents; and
   using the two polling frequencies to define upper and lower boundaries of the second input current frequency range.

5. The method as in claim 3, wherein determining the second input current frequency range around the input current minimum comprises:
   determining two polling frequencies adjacent a polling frequency having a lowest input current; and
   using the two polling frequencies to define upper and lower boundaries of the second input current frequency range.

6. The method as in claim 5, further comprising defining a plurality of frequency maps having a measurement distribution determined from a probability of the input current minimum being within a frequency range of the respective frequency map and polling frequencies within the respective frequency maps.

7. The method as in claim 1, wherein when the polling frequency having the lowest input current cannot be determined above an input current uncertainty limit, further comprising:
   segmenting an input current versus input current frequency response curve into a lower response curve above the input current uncertainty limit and an upper response curve above the input current uncertainty limit; and
   selecting a highest frequency point on the lower response curve above the input current uncertainty limit as the charging frequency.

8. The method as in claim 1, wherein when the polling frequency having the lowest input current cannot be determined above an input current uncertainty limit, further comprising:
   segmenting an input current versus input current frequency response curve into a lower response curve above the input current uncertainty limit and an upper response curve above the input current uncertainty limit; and
   selecting as the charging frequency a mid-point frequency between a lower intersection frequency where the lower response curve intersects the input current uncertainty limit and an upper intersection frequency where the upper response curve intersects the input current uncertainty limit.

9. The method as in claim 1, wherein when the polling frequency having the lowest input current cannot be determined above an input current uncertainty limit, further comprising:
   segmenting an input current versus input current frequency response curve into a lower response curve above the input current uncertainty limit and an upper response curve above the input current uncertainty limit; and
      selecting as the charging frequency a frequency between a lower intersection frequency where the lower response curve intersects the input current uncertainty limit and a mid-point frequency between the lower intersection frequency and an upper intersection frequency where the upper response curve intersects the input current uncertainty limit, wherein the selected frequency is an offset from the lower intersection frequency, said offset being a percentage of a distance between the lower intersection frequency and the mid-point frequency.

10. The method as in claim 1, wherein when the polling frequency having the lowest input current cannot be determined above an input current uncertainty limit, further comprising:
   segmenting an input current versus input current frequency response curve into a lower response curve above the input current uncertainty limit and an upper response curve above the input current uncertainty limit;
   using a first linear projection of the lower response curve based on at least two polling frequencies adjacent to the input current uncertainty limit for the lower response curve and a second linear projection of the upper response curve based on at least two polling frequencies adjacent to the input current uncertainty limit to find an intersection point between the first and second linear projections; and
   selecting a frequency of the intersection point as the charging frequency.

11. The method as in claim 1, wherein when the polling frequency having the lowest input current cannot be determined above an input current uncertainty limit, further comprising:
   segmenting an input current versus input current frequency response curve into a lower response curve above the input current uncertainty limit and an upper response curve above the input current uncertainty limit;
   fitting curves to at least three polling frequencies adjacent to the input current uncertainty limit for the lower response curve and for the upper response curve to find an intersection point between curves fitted to the lower response curve and the upper response curve; and
   selecting a frequency of the intersection point as the charging frequency.

12. The method as in claim 1, further comprising repeating the first input current frequency range determining step, frequency polling step, and charging frequency selecting step a plurality of times for different input voltages for each iteration.

13. The method as in claim 12, wherein the different input voltages for each iteration are different percentages of a requested power level, further comprising:
   determining a relationship between power level and resonant frequency at each power level; and
   determining from the relationship a resonant frequency at the requested power level.

14. The method as in claim 1, further comprising avoiding transmitting coil overcurrent due to over-coupling between the transmitting coil and the receiving coil by:
   making a first current measurement at a lower frequency boundary of the frequency range; and
   when the first current measurement is above a safety current threshold for current sensing, aborting the charging frequency determination or resuming the charging frequency determination at a lower fixed input voltage level to the transmitting coil.

15. The method as in claim 1, wherein setting an input voltage to the transmitting coil at a fixed voltage comprises shunting the receiving coil, setting the first input current frequency at a polling frequency in the first input current frequency range, varying the input voltage to the transmitting coil in increments, measuring input current to the transmitting coil at each voltage increment until a safety margin threshold but not an adversity threshold is exceeded by the input current measurement, and selecting the fixed voltage as a voltage at a last voltage increment where the input current measurement is below the safety margin threshold.

16. The method as in claim 15, wherein varying the input voltage to the transmitting coil in increments comprises using a first voltage increment until the transmitting coil's input current exceeds a guard threshold less than the safety margin threshold, and using a second voltage increment, smaller than the first voltage increment, until the transmitting coil's input current exceeds the safety margin threshold or a nominal test voltage is obtained.

17. A wireless power transfer (WPT) charger, comprising:
   a transmitting coil that wirelessly transmits electrical energy to a receiving coil at a charging frequency; and a controller that includes a processor that executes instructions to determine the charging frequency between the transmitting coil and the receiving coil by performing operations including:
  setting an input voltage to the transmitting coil at a fixed voltage;
  shunting the receiving coil;
  determining a first input current frequency range in which a resonant frequency is expected to be found;
  frequency polling within the first input current frequency range using a set of polling frequencies in the first input current frequency range; and
  selecting as the charging frequency a polling frequency having a lowest input current.

18. The WPT charger of claim 17, wherein the processor of the controller further executes instructions to determine the first input current frequency range in which the resonant frequency is expected to be found by performing operations comprising:
  setting the first input current frequency range based on at least one of regulation, international electromagnetic frequency allotments, or prior experience with WPT between the transmitting coil and the receiving coil.

19. The WPT charger of claim 17, wherein the processor of the controller further executes instructions to poll frequencies within the first input current frequency range by performing operations comprising:
  determining an input current minimum at the set of polling frequencies;
  determining a second input current frequency range around the input current minimum that is narrower than the first input current frequency range; and
  frequency polling within the second input current frequency range using a second set of polling frequencies in the second input current frequency range.

20. The WPT charger of claim 17, wherein the processor of the controller further executes instructions to determine the second input current frequency range around the input current minimum by performing operations comprising:
  determining two polling frequencies in the set of polling frequencies with the lowest input currents; and
  using the two polling frequencies to define upper and lower boundaries of the second input current frequency range.

21. The WPT charger of claim 17, wherein the processor of the controller further executes instructions to determine the second input current frequency range around the input current minimum by performing operations comprising:
  determining two polling frequencies adjacent a polling frequency having a lowest input current; and
  using the two polling frequencies to define upper and lower boundaries of the second input current frequency range.

22. The WPT charger of claim 21, wherein the processor of the controller further executes instructions to perform polling within the second input current frequency range around the input current minimum by performing operations comprising defining a plurality of frequency maps having a measurement distribution determined from a probability of the input current minimum being within a frequency range of the respective frequency map and polling frequencies within the respective frequency maps.

23. The WPT charger of claim 17, wherein when the polling frequency having the lowest input current cannot be determined above an input current uncertainty limit, the processor of the controller further executes instructions to perform operations comprising:
  segmenting an input current versus input current frequency response curve into a lower response curve above the input current uncertainty limit and an upper response curve above the input current uncertainty limit; and
  selecting a highest frequency point on the lower response curve above the input current uncertainty limit as the charging frequency.

24. The WPT charger of claim 17, wherein when the polling frequency having the lowest input current cannot be determined above an input current uncertainty limit, the processor of the controller further executes instructions to perform operations comprising:
  segmenting an input current versus input current frequency response curve into a lower response curve above the input current uncertainty limit and an upper response curve above the input current uncertainty limit; and
  selecting as the charging frequency a mid-point frequency between a lower intersection frequency where the lower response curve intersects the input current uncertainty limit and an upper intersection frequency where the upper response curve intersects the input current uncertainty limit.

25. The WPT charger of claim 17, wherein when the polling frequency having the lowest input current cannot be determined above an input current uncertainty limit, the processor of the controller further executes instructions to perform operations comprising:
  segmenting an input current versus input current frequency response curve into a lower response curve above the input current uncertainty limit and an upper response curve above the input current uncertainty limit; and
  selecting as the charging frequency a frequency between a lower intersection frequency where the lower response curve intersects the input current uncertainty limit and a mid-point frequency between the lower intersection frequency and an upper intersection frequency where the upper response curve intersects the input current uncertainty limit, wherein the selected frequency is an offset from the lower intersection frequency, said offset being a percentage of a distance between the lower intersection frequency and the mid-point frequency.

26. The WPT charger of claim 17, wherein when the polling frequency having the lowest input current cannot be determined above an input current uncertainty limit, the processor of the controller further executes instructions to perform operations comprising:
  segmenting an input current versus input current frequency response curve into a lower response curve above the input current uncertainty limit and an upper response curve above the input current uncertainty limit;
  using a first linear projection of the lower response curve based on at least two polling frequencies adjacent to the input current uncertainty limit for the lower response curve and a second linear projection of the upper response curve based on at least two polling frequencies adjacent to the input current uncertainty limit to find an intersection point between the first and second linear projections; and
  selecting a frequency of the intersection point as the charging frequency.

27. The WPT charger of claim 17, wherein when the polling frequency having the lowest input current cannot be determined above an input current uncertainty limit, the processor of the controller further executes instructions to perform operations comprising:

segmenting an input current versus input current frequency response curve into a lower response curve above the input current uncertainty limit and an upper response curve above the input current uncertainty limit;

fitting curves to at least three polling frequencies adjacent to the input current uncertainty limit for the lower response curve and for the upper response curve to find an intersection point between curves fitted to the lower response curve and the upper response curve; and selecting a frequency of the intersection point as the charging frequency.

28. The WPT charger of claim 17, wherein the processor of the controller further executes instructions to perform operations comprising:

repeating the first input current frequency range determining step, frequency polling step, and charging frequency selecting step a plurality of times for different input voltages for each iteration.

29. The WPT charger of claim 28, wherein the different input voltages for each iteration are different percentages of a requested power level, and the processor executes additional instructions to perform operations comprising:

determining a relationship between power level and resonant frequency at each power level; and determining from the relationship a resonant frequency at the requested power level.

30. The WPT charger of claim 17, wherein the processor executes additional instructions to avoid transmitting coil overcurrent due to over-coupling between the transmitting coil and the receiving coil by performing operations comprising:

making a first current measurement at a lower frequency boundary of the frequency range; and when the first current measurement is above a safety current threshold for current sensing, aborting the charging frequency determination or resuming the charging frequency determination at a lower fixed input voltage level to the transmitting coil.

31. The WPT charger of claim 17, wherein the processor executes additional instructions to set an input voltage to the transmitting coil at a fixed voltage by performing operations comprising:

shunting the receiving coil;

setting the first input current frequency at a polling frequency in the first input current frequency range;

varying the input voltage to the transmitting coil in increments;

measuring input current to the transmitting coil at each voltage increment until a safety margin threshold but not an adversity threshold is exceeded by the input current measurement; and selecting the fixed voltage as a voltage at a last voltage increment where the input current measurement is below the safety margin threshold.

32. The WPT charger of claim 31, wherein the processor executes additional instructions to vary the input voltage to the transmitting coil in increments by performing operations comprising:

using a first voltage increment until the transmitting coil's input current exceeds a guard threshold less than the safety margin threshold; and using a second voltage increment, smaller than the first voltage increment, until the transmitting coil's input current exceeds the safety margin threshold or a nominal test voltage is obtained.

\* \* \* \* \*